(12) United States Patent
Stefanov et al.

(10) Patent No.: US 9,015,853 B2
(45) Date of Patent: Apr. 21, 2015

(54) CONCEALING ACCESS PATTERNS TO ELECTRONIC DATA STORAGE FOR PRIVACY

(71) Applicant: The Regents of the University of California, Oakland, CA (US)

(72) Inventors: Emil Stefanov, Hayward, CA (US); Elaine Shi, San Jose, CA (US); Dawn Song, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 122 days.

(21) Appl. No.: 13/919,621

(22) Filed: Jun. 17, 2013

(65) Prior Publication Data

US 2014/0007250 A1 Jan. 2, 2014

Related U.S. Application Data

(60) Provisional application No. 61/660,654, filed on Jun. 15, 2012.

(51) Int. Cl.
*G06F 21/10* (2013.01)
*G06F 21/60* (2013.01)
*G06F 21/62* (2013.01)

(52) U.S. Cl.
CPC .............. *G06F 21/60* (2013.01); *G06F 21/606* (2013.01); *G06F 21/6254* (2013.01); *G06F 2221/2123* (2013.01)

(58) Field of Classification Search
CPC ............... H04L 9/06; H04L 9/00; G09C 1/04
USPC ................ 726/24–26, 36; 713/181–189, 170; 707/769
See application file for complete search history.

(56) References Cited

U.S. PATENT DOCUMENTS

| | | | |
|---|---|---|---|
| 7,242,772 B1 * | 7/2007 | Tehranchi | 380/223 |
| 8,230,229 B2 * | 7/2012 | Roscoe et al. | 713/181 |
| 8,654,971 B2 * | 2/2014 | Orsini et al. | 380/33 |
| 2009/0254750 A1 * | 10/2009 | Bono et al. | 713/170 |
| 2012/0272320 A1 * | 10/2012 | Rados et al. | 726/24 |
| 2013/0013931 A1 * | 1/2013 | O'Hare et al. | 713/189 |

OTHER PUBLICATIONS

PK Tysowski, Re-Encryption Based Key Management towards Secure and Scalable Mobile Applications, May 2011, IACR.org, pp. 1-8.*

* cited by examiner

*Primary Examiner* — Dede Zecher
*Assistant Examiner* — Viral Lakhia
(74) *Attorney, Agent, or Firm* — John P. O'Banion

(57) ABSTRACT

Methods and systems of concealing access patterns to data storage, such as within servers of a cloud computing environment are presented. Server data storage is securely partitioned into smaller electronic data storage partitions of predetermined size. The client side maintains a shuffling buffer and position map for these blocks as stored on the electronic data storage partitions of the server. Concealment is performed with respect to accesses from the client to server using an oblivious sorting protocol. Access operation is concealed with each block being randomly assigned to any of the data storage partitions, and whenever a block is accessed, the block is logically removed from its current partition and logically assigned to a fresh random partition selected from all partitions, while the client maintains tracking of which partition each block is associated with at any point of time.

21 Claims, 23 Drawing Sheets

Access(op, u, data*):
1: $r \leftarrow$ UniformRandom(1 ... P)
2: $p \leftarrow$ position[u], position[u] $\leftarrow r$
3: if block u is in slot[p] then
4:     data $\leftarrow$ slot[p].read_and_del(u)
5:     ReadPartition(p, $\perp$)
6: else
7:     data $\leftarrow$ ReadPartition(p, u)
8: end if
9: if op = write then
10:    data $\leftarrow$ data*
11: end if
12: slot[r] $\leftarrow$ slot[r] $\cup$ {(u, data)}
13: Call Evict(p)    /*Optional eviction piggy-backed on normal data access requests. Can improve performance by a constant factor.*/
14: Call SequentialEvict(v) or RandomEvict(v)
15: return data

FIG. 3

```
Evict(p):
 1:  if len(slot[p]) = 0 then
 2:      WritePartition(p, ⊥, None)
 3:  else
 4:      (u, data) ← slot[cnt].pop()
 5:      WritePartition(cnt, u, data)
 6:  end if
```

FIG. 4A

```
RandomEvict(v):
 1:  for i = 1 to v do     //Assume integer v
 2:      r ← UniformRandom(1 . . . P)
 3:      Evict(r)
 4:  end for
```

FIG. 4B

```
SequentialEvict(v):
 1:  num ← D(v)        // Pick the number of blocks to evict according to distribution D
 2:  for i = 1 to num do
 3:      cnt ← cnt + 1   //cnt is a global counter for the sequential scan
 4:      Evict(cnt)
 5:  end for
```

ReadPartition(p, u):

1: L ← number of levels
2: for ℓ = 0, 1, ..., L − 1   (in parallel) do
3:     if level ℓ of partition p is not filled then
4:         continue // *skip empty levels*
5:     end if
6:     if block u is in partition p, level ℓ then
7:         i = position[u].index
8:     else
9:         i = nextDummy[p, ℓ]
10:        nextDummy[p, ℓ] ← nextDummy[p, ℓ] + 1
11:    end if
12:    i' = PRP (K [p, ℓ], i)
13:    Fetch from the server the block in partition p, level ℓ, and offset i'.
14:    Decrypt the block with the key K [p, ℓ].
15: end for

FIG. 5

WritePartition(p, u*, data*):

1: // Read consecutively filled levels into the client's shuffling buffer denoted sbuffer.
2: $\ell_0 \leftarrow$ last consecutively filled level
3: for $\ell = 0$ to $\ell_0$ do
4:    Fetch the metadata (list of block ID's) for level $\ell$ in partition $p$. Decrypt with key $K[p, \ell]$.
5:    Fetch exactly $2^\ell$ previously unread blocks from level $\ell$ into sbuffer such that all unread real blocks are among them. Decrypt everything with the key $K[p, \ell]$. Ignore dummy blocks when they arrive.
6:    Mark level $\ell$ in partition $p$ as *unfilled*.
7: end for
8: $\ell = \min(\ell_0, L - 1)$ // Don't spill above the top level.
9: Add the $(u^*, data^*)$ to sbuffer.
10: $k \leftarrow$ number of real blocks in sbuffer.
11: for $i = 1$ to $k$ do
12:    Let $(u, data) = sbuffer[i]$
13:    position$[u] \leftarrow \{p, \ell, i\}$ // update position map
14: end for
15: $K[p, \ell] \leftarrow_R K$    // generate fresh key for level $\ell$ in partition $p$
16: Pad the shuffling buffer with dummy blocks up to length $2 \cdot 2^\ell$. // The first $k$ blocks are real and the rest are dummy.
17: Permute sbuffer with $PRP_f(K[p, \ell], \cdot)$. A block originally at index $i$ in the shuffling buffer is now located at offset $i'$ in the shuffling buffer, where $i' = PRP_{\ell}(K[p, \ell], i)$
18: Write the shuffling buffer into level $\ell$ in partition $p$ on the server, encrypted with key $K[p, \ell]$.
19: Write the metadata (list of block ID's) of level $\ell$ in partition $p$ to the server, encrypted with key $K[p, \ell]$.
20: Mark level $\ell$ in partition $p$ as *filled*.
21: nextDummy$[p, \ell] \leftarrow k + 1$ // initialize counter to first dummy block.

Notations:

| | |
|---|---|
| $K[p, \ell]$ | Secret key for partition $p$, level $\ell$. (PRP or AES key depending on context) |
| nextDummy$[p, \ell]$ | Index of next unread dummy block for partition $p$, level $\ell$. |
| $\{p, \ell, i\} \leftarrow$ position$[u]$ | Position information for block $u$ (partition $p$, level $\ell$, index $i$ within the level). |

TimeStep(op):

1: if op is ReadPartition(p, u) then
2:     Call ConcurrentReadPartition(p, u)
3: else if op is WritePartition(p, u, data) then
4:     $\lambda \leftarrow$ max $i$ for which $C_p = 0 \bmod 2^i$.
5:     $\beta \leftarrow \{(u, data)\}$
6:     if $(p, \lambda', \beta') \in Q$ for some $\lambda'$ and $\beta'$ then
7:         $Q \leftarrow Q - \{(p, \lambda', \beta')\}$
8:         $\lambda \leftarrow \max(\lambda, \lambda'), \beta \leftarrow \beta' \cup \beta$
9:     end if
10:    $Q \leftarrow Q \cup \{(p, \lambda, \beta)\}$
11:    $C_p \leftarrow C_p + 1$
12: end if
13: Perform $O(\log N)$ work from job queue $Q$ in the form of ConcurrentWritePartition operations.

> The partitioning framework [40]
> // Divide the ORAM into $\sqrt{N}$ partitions each of capacity $\sqrt{N}$.
>
> Read(blockid):
> - Look up position map and determine that blockid is assigned to partition $p$.
> - If blockid is not found in eviction caches:
>   - ReadPartition($p$, blockid)
>
>   Else if blockid is found in local eviction caches:
>   - ReadPartition($p, \bot$)   //read dummy
> - Pick a random partition $p'$, add the block identified by blockid to the eviction caches, and logically assign blockid to partition $p'$.
> - Call Evict $\nu$ times where $\nu > 1$ is the eviction rate.
>
> Evict:
> - Pick a random partition $p$.
> - If a block exists in the eviction cache assigned to partition $p$, write it back to partition $p$ of the server.
> - Else, write a dummy block to partition $p$ of the server.

ORAM main loop:
- Decrement the early cache-in semaphore by the number of levels.  // *Reserve space for early cache-ins.*
- Decrement the eviction semaphore by eviction rate.  // *Evictions must be performed later to release the "eviction resource".*
- Fetch the next data access request for blockid, look up the position map to determine that blockid is assigned to partition $p$.
- Call ReadPartition($p$, blockid).
- On callback:
  - Store the block to the eviction cache (overwrite block if this is an ORAM write request).
  - Let $\nu$ denote the eviction rate. Choose $\nu$ partitions at random for eviction, by incrementing their respective job sizes: $J_p \leftarrow J_p + 1$
  // *If $\nu$ is a floating number, choose at least $\nu$ partitions on average.*

**ReadPartition($p^*$, blockid):**
1) Looks up the position map to determine the level $\ell^*$ where blockid resides. If the requested block is a dummy or blockid is not found in partition $p^*$, then set $\ell^* \leftarrow \perp$.
2) For each level in partition $p^*$ that satisfies one of the following conditions: increment early cache-in semaphore by 1:
   - the level is empty;
   - the level is not marked for shuffling; or
   - the level is marked for shuffling but all blocks have been cached in.
3) For each filled level $\ell$ in partition $p^*$:
   - If $\ell = \ell^*$, ReadReal($\ell$, blockid).    Else, ReadFake($\ell$).

> ReadReal($\ell$, blockid):
> - If blockid has been cached in:
>   – Call ReadFake($\ell$)
>   – On completion of the fake (i.e., dummy or early) cache-in: return contents of blockid through callback.  /* *To prevent timing channel leakage, must wait for fake cache-in to complete before returning the block to ORAM main.* */
> - Else:
>   – Cache in block blockid from server.
>   – On completion of cache-in, return contents of blockid through callback.

> ReadFake($\ell$):
> - If level $\ell$ is not being shuffled:
>   – Get address addr of next random dummy block.
>   – Cache in the dummy block at addr.
> - If level $\ell$ is being shuffled, and level $\ell$ has unread blocks,
>   – Perform an early cache-in.
> - Else return with $\perp$.

FIG. 21

Background shuffler loop:
1) Start shuffling.
 - Find a partition $p$ whose bShuffle indicator is 0 and job size $J_p > 0$. Start the shuffling of partition $p$.
 - Set bShuffle ← 1 for partition $p$.  // Each partition can only have one active shuffling job at a time.
 - Mark levels for shuffling.
 - Take a snapshot of the partition job size $\hat{J}_p \leftarrow J_p$.
2) Cache-in and reserve space.
 - For each unread block $B$ in each level marked for shuffling:
   – Decrement: 1) shuffling buffer semaphore, and 2) shuffling I/O semaphore;
   – Issue a CacheIn request for $B$.
 - Let $r$ denote the number of reserved slots in shuffling buffer so far. Let $w$ denote the number of cache-outs that will be performed after this partition is shuffled. Note that $r \leq w$.
   Decrement the shuffling buffer semaphore by $w - r$.
   // Reserve space in shuffling buffer for early cache-ins, unevicted blocks, and dummy blocks.

FIG. 22A

3) Upon completion of all cache-ins, perform atomic shuffle.
   /* Since computation is much cheaper than bandwidth or latency, we assume that the local shuffle is done atomically. */
   • Fetch.
     – Fetch from the storage cache all cached-in blocks for levels marked for shuffling. For each cache-in fetched that is an early cache-in, increment the early cache-in semaphore.
       // These early cache-ins are now accounted for by the shuffling buffer semaphore.
     – Let $\widehat{J}_p$ denote the job size at the start of this shuffling. Fetch $\widehat{J}_p$ blocks from the eviction cache corresponding to the partition. Increment eviction cache semaphore by $\widehat{J}_p$.
       /* If fewer than $\widehat{J}_p$ blocks for this partition exists in the eviction cache, the eviction cache returns dummy blocks to pad. These unevicted cache blocks are now accounted for by the shuffling buffer semaphore. */
   • Shuffle.
     – Add dummies to the shuffling buffer to pad its size to $w$.
     – Permute the shuffling buffer.
   • Store.
     – Store shuffled blocks into storage cache: for each level $\ell$, store exactly $2 \cdot 2^\ell$ blocks from the shuffling buffer (at least half of which are dummy). Mark destination levels as filled.
   • Unmark levels for shuffling. Set partition counter $C_p \leftarrow (C_p + \widehat{J}_p) \bmod \text{partition\_capacity}$. Clear bShuffle $\leftarrow 0$.

4) Cache-out.
   • For each block $B$ to be cached out:
     – Decrement the shuffling I/O semaphore.
     – Issue a CacheOut call for block $B$.
   • On each cache-out completion: increment the shuffling buffer semaphore.

FIG. 22B

CONCEALING ACCESS PATTERNS TO ELECTRONIC DATA STORAGE FOR PRIVACY

CROSS-REFERENCE TO RELATED APPLICATIONS

This application is a nonprovisional of U.S. provisional patent application Ser. No. 61/660,654 filed on Jun. 15, 2012, incorporated herein by reference in its entirety.

STATEMENT REGARDING FEDERALLY SPONSORED RESEARCH OR DEVELOPMENT

This invention was made with Government support under Grant No. DGE-0946797 awarded by the National Science Foundation, under Grant Numbers CCF-0424422, 0311808, 0832943, 0448452, 0842694, 0627511, 0842695, 0808617, and 0831501 CT-L awarded by the National Science Foundation, under Grant No. FA9550-09-1-0539 awarded by the Air Force Office of Scientific Research, under Grant No. P010071555 awarded by the Air Force Research Laboratory, under Grant No. N000140911081 awarded by the Office of Naval Research, and under Grant No. FA9550-08-1-0352 awarded by the Air Force Office of Scientific Research. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to computer security, and more particularly to concealing access patterns to disk and memory.

2. Description of Related Art

Many enterprises and individuals encrypt data that they store in the cloud to achieve confidentiality and privacy. However, when data is accessed interactively (such as through online cloud storage services like Dropbox and SkyDrive), encryption is not enough to ensure privacy. By observing the locations of data accessed, an attacker can often easily recover information about the encrypted data without ever needing to decrypt it. It will be noted that cloud computing is the practice of using a network of remote servers hosted on the Internet to store, manage, and process data, rather than using a local server.

As cloud computing gains momentum, an increasing amount of data is outsourced to cloud storage, and data privacy has become an important concern for many businesses and individuals alike. Encryption alone may not suffice for ensuring data privacy, as the mere knowledge of data access patterns can provide a significant amount of information about the data as well. One example found in the literature described a sequence of data access requests q1; q2; q3 that were always followed by a stock exchange operation, whereby sensitive information can be obtained by the server, or at the server, even when the data is encrypted.

Oblivious RAM (or O-RAM) is a term which has come to mean a primitive intended for hiding storage access patterns, with the problem being initially studied in the context of software protection, i.e., hiding a program's electronic data storage (memory) access patterns to prevent reverse engineering. With the trend of cloud computing, O-RAM also has important applications in privacy-preserving storage outsourcing applications.

Accordingly, a need exists for a practical method and apparatus for implementing a form of Oblivious RAM for concealing access patterns to electronic data storage (e.g., disk and memory) for enhancing security.

BRIEF SUMMARY OF THE INVENTION

A method of concealing access patterns to data storage systems, including disk and/or memory, such as in a cloud environment, to protect privacy. The inventive method augments the use of file encryption, preventing malicious attackers, and even the cloud provider itself from being able to determine which files (or portions of files) the client is accessing. Without this form of security, malicious attackers and others could obtain sensitive information about what operations clients are performing with their sensitive data at different points in time.

An important element of the inventive method involves securely partitioning server storage, which is a very important element toward achieving practical performance under realistic scenarios. The method provides elements which are reusable and extensible. In fact, a portion of the inventive method is a framework that can be combined with other techniques to enhance their security, while still remaining within the teachings of the present invention.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3 is a listing of process steps for performing secure data access according to an embodiment of the present invention.

FIG. 4A through FIG. 4C are listings of process steps for different forms of evictions according to an embodiment of the present invention.

FIG. 5 is a listing of process steps for performing a read partition operation according to an embodiment of the present invention.

FIG. 7 is a listing of process steps for performing a write partition operation according to an embodiment of the present invention.

FIG. 12 is a listing of process steps for performing amortization according to an embodiment of the present invention.

FIG. 16 is a listing of process steps for the partitioning framework of the O-RAM according to an embodiment of the present invention.

FIG. 18 is a listing of process steps for the O-RAM main loop within an O-RAM according to an embodiment of the present invention.

FIG. 19 is a listing of process steps for the read partition process within an O-RAM according to an embodiment of the present invention.

FIG. 20 is a listing of process steps for a real read within an O-RAM according to an embodiment of the present invention.

FIG. 21 is a listing of process steps for a fake read within an O-RAM according to an embodiment of the present invention.

FIG. 22A and FIG. 22B is a listing of process steps for the background shuffler loop within an O-RAM according to an embodiment of the present invention.

DETAILED DESCRIPTION OF THE INVENTION

Figure 1:
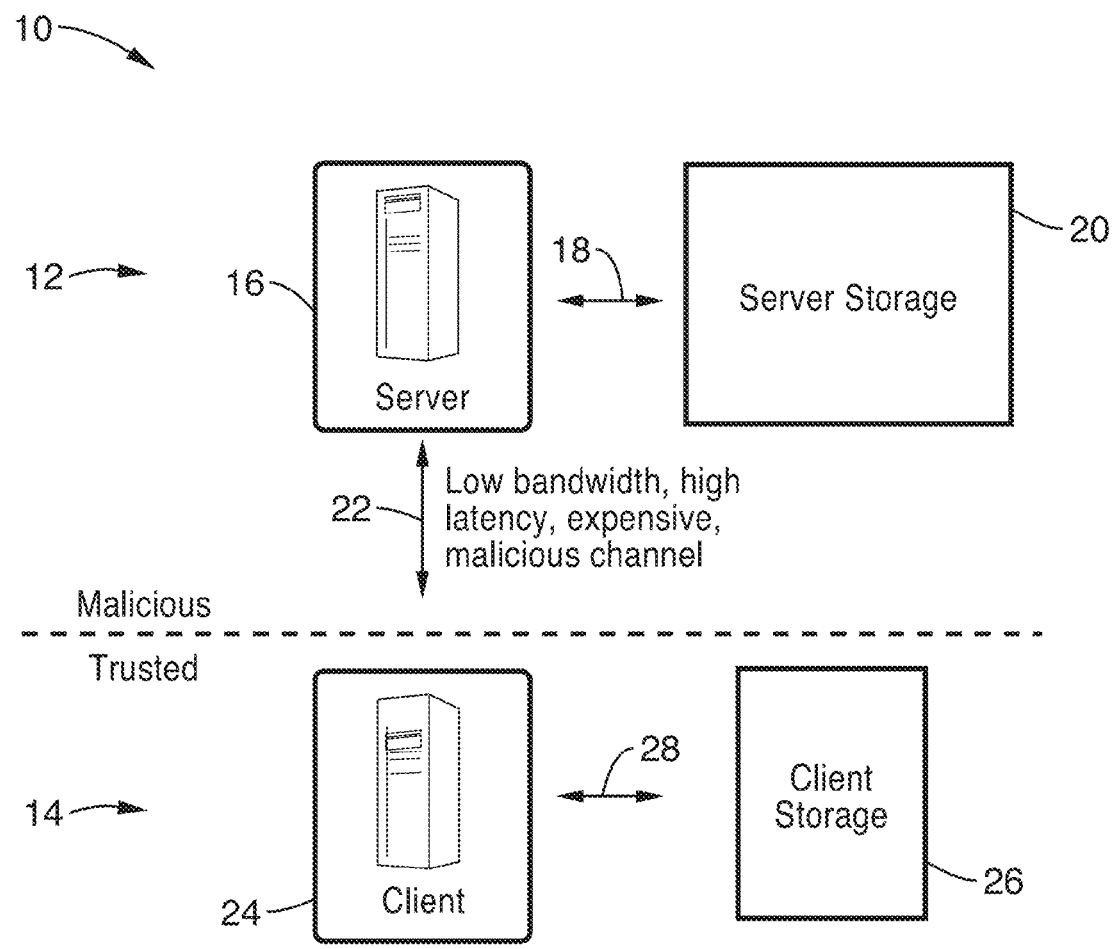
FIG. 1 is a block diagram of an oblivious RAM (O-RAM) system according to an embodiment of the present invention.

1. Introduction.

The inventive method provides for securely partitioning server storage to conceal client access patterns to data which resides in a cloud environment. Additional elements of the invention aid in regard to reducing network latency and memory requirements. The invention can be implemented in a variety of apparatus and applications to provide an important security feature for enhancing existing cloud storage services.

The inventive method of concealing access patterns yields a number of advantages over alternative techniques. This problem is generally referred to as Oblivious RAM (O-RAM)), and attempts to solve it have been proposed since 1987.

Industry interest in O-RAM has recently sparked, perhaps due in part to its potential high impact in privacy-preserving storage outsourcing applications. Even the best attempts at solving the O-RAM problem currently require levels of overhead which are generally considered impractical.

Toward simplifying understanding of the concept, a case is described throughout this patent application, of a scenario in which a client desires to store N blocks each of size B bytes at an untrusted server. It will be appreciated that the method and system of the invention can be utilized with data storage containing any number of blocks of any size. Specifically, in this example case let N denote the total storage capacity of the O-RAM in terms of the number of blocks. It should be appreciated that the "O" (referred to in mathematics as "big O notation") as found in many of the equations herein is a notation for asymptotic complexity. For example, "y being $O(N)$" means that variable y is less than or equal to $k*N$ for all values of the variable N and some fixed constant value k.

One of these O-RAM proposals achieves $O((\log N)^2)$ amortized cost when parameterized with $O(1)$ client-side storage; while achieving $O(\log N)$ amortized cost when parameterized with $O(N^a)$ client-side storage where $0<a<1$. In this context, an amortized cost of $f(N)$ indicates that each data request generates $f(N)$ read or write operations on the server. Despite providing elegant asymptotic guarantees, the practical performance of these existing O-RAM constructions are still unsatisfactory. Table 1 compares the O-RAM schemes by Goldreich-Ostrovsky (O. Goldreich and R. Ostrovsky. *Software protection and simulation on oblivious rams. J. ACM*, 1996.5), Pinkas-Reinman (B. Pinkas and T. Reinman. *Oblivious ram revisited*. In CRYPTO, 2010), and Goodrich-Mitzenmacher (M. T. Goodrich and M. Mitzenmacher. *Privacy-preserving access of outsourced data via oblivious ram simulation. CoRR*, abs/1007.1259, 2010), with that of various implementations of the present invention, specifically various combinations of concurrent, non-concurrent, practical and theoretical implementations.

In Table 1, the practical performance is the number of client-server operations per O-RAM operation for typical realistic parameters, (e.g., when the server stores terabytes of data, and the client has several hundred megabytes to gigabytes of local storage, and $N \geq 2^{20}$. For the theoretic constructions considered herein, the same asymptotic bounds also work for the more general case where client-side storage is $N^a$ for some constant $0<a<1$.

The construction by Goodrich and Mitzenmacher when parameterized with $N^a$ ($a<1$) client-side storage has an overhead of more than 1,400× compared to non-oblivious storage under reasonable parameterization. This means that the overhead of that scheme is 1,400 times greater than the operation without the use of that oblivious storage technique. Although this level of overhead is the best we have found in the literature for O-RAM, it is considered prohibitively high in practice, and is perhaps why, despite the passing of more than two decades since the Oblivious RAM concept was first considered, it has remained largely a theoretical concept. This overhead translates to requiring a client to transfer gigabytes of information to the cloud in order to upload a 1 MB file. As a result, previous algorithms have not been deployed and they have only been studied as a research problem.

In contrast, the present invention requires significantly less overhead and can be considered a practical O-RAM method. The inventive method is compatible with existing internet bandwidth speeds, with tested embodiments of the invention requiring at least 63 times less bandwidth than previous proposals.

The present invention, also overcomes the high latency problems that previous O-RAM proposals suffer from. For example, with these previous proposals a user can be required to periodically wait hours to upload a new file while the cloud reorganizes data.

The present invention thus provides a practical method which may be utilized in a number of application areas. The invention can be viewed as a security feature that can be incorporated into various systems to enhance cloud storage services. In fact, the method is compatible with some of the most popular and widely deployed cloud storage services today, such as: Microsoft SkyDrive, Amazon S3, Dropbox, Google Drive, Mozy, and similar applications.

The method is particularly well-suited for a number of applications, which include, but are not limited to the following. (1) Deployment of the method within servers that secure data accesses to new or existing cloud storage services. In this application it can for example, provide: (a) securing corporate network file systems, (b) protecting data stored to and retrieved from databases, and (c) blob storage of web application. (2) Deployment of the method by individual consumers as an application that provides secure cloud storage and backup. In this application, it can be used for example: (a) as a feature of SkyDrive, Dropbox, or Mozy; and (b) as a remote file system. (3) Deployment of the method by governments, and its associated agencies, which store and retrieve data remotely.

Some additional uses of the inventive techniques include the following. (a) The invention may be utilized within computer memory (e.g., RAM) modules, such as incorporated within a DRAM memory controller that conceals which portions of memory are being accessed. (b) The invention can secure co-processors. (c) The invention can be incorporated within military equipment susceptible to reverse-engineering attacks. (d) The invention can be integrated into game consoles (e.g., XBox and PlayStation) which already attempt to do similar things such as encrypting memory accesses for preventing piracy of games. (e) The invention is also applicable to use within smartcards (e.g., any small sized card, such as pocket sized or less, containing embedded integrated circuits) as part of the firmware to extend the amount of memory usable by the smartcard by securely storing additional data on a computer's hard drive.

1.1. Results from Use of Inventive O-RAM.

One of the principle objects of the invention is to make Oblivious RAM (O-RAM) practical for cloud outsourcing applications. An Oblivious RAM construction is geared towards optimal practical performance. The practical construction achieves an amortized overhead of approximately 20 to 35 times.

Tables 1 and 2 show that the inventive technique, tested so far, is about 63 times faster than the best known construction. In addition, this practical construction also achieves sub-linear O(log N) worst-case cost, and constant round-trip latency per operation. Although practical construction of the inventive method requires asymptotically linear amounts of client-side storage, the constant is small (e.g., 0.01% to 0.3% of O-RAM capacity) that in realistic settings, the amount of client-side storage is comparable to $\sqrt{N}$.

Theoretical construction. By applying recursion to the practical construction, client-side storage can be reduced to a sub-linear amount, while obtaining a novel construction of theoretic interest, achieving $O((\log N)^2)$ amortized and worst-case cost, and requires $O(\sqrt{N})$ client-side storage, and $O(N)$ server-side storage. Note that in the $O((\log N)^2)$ asymptotic notation, one of the log N factors stems from the depth of the recursion; and in realistic settings (see Table 2), the depth of the recursion is typically 2 or 3.

Table 1 summarizes the characteristics of the inventive method in comparison to related work on O-RAM.

Table 2 provides suggested parameterizations for practical construction of embodiments according to the present invention.

1.2. Main Technique: Partitioning.

The present invention provides a novel partitioning technique, which is the key to achieving the claimed theoretical bounds as well as major practical savings. The basic idea is to partition a single O-RAM of size N blocks into P different O-RAMs of size roughly N/P blocks each. This allows us to break down a larger O-RAM into multiple smaller O-RAMs.

The idea of partitioning is motivated by the fact that the major source of overhead in existing O-RAM constructions arises from an expensive remote oblivious sorting protocol performed between client and server. Because the oblivious sorting protocol can take up to O(N) time, existing O-RAM schemes require $\Omega(N)$ time in the worst-case or have unreasonable $O(\sqrt{N})$ amortized cost. It should be noted that $\Omega$ notation is associated with the "Big O" notation described earlier, but is directed to bounding something below instead of above.

In the inventive method O-RAM is partitioned into roughly $P=\sqrt{N}$ partitions, each having approximately $\sqrt{N}$ blocks. In this way the client can use $\sqrt{N}$ blocks of storage to sort and/or shuffle (reshuffle) the data blocks locally, and then simply transfer the reshuffled data blocks to the server. This process not only circumvents the need for the expensive oblivious sorting protocol, but also allows the inventive method to achieve $O(\sqrt{N})$ worst-case cost. Furthermore, by allowing reshuffling to happen concurrently with reads, the invention further reduces worst-case cost of the practical construction to O(log N). It should be appreciated that data need not be stored in sequentially numbered blocks, it may be stored in any desired manner, for example using a sparse key-value store instead.

It should be appreciated that the use of partitioning itself provides an attendant security challenge, as partitioning creates an extra channel through which data access patterns can potentially be inferred by observing the access sequence of partitions. Accordingly, the present invention performs steps that assure that the sequence of partitions accessed does not leak information about the identities of blocks being accessed. Specifically, the inventive construction ensures that the sequence of partitions accessed appears pseudo-random to an untrusted server.

It is worth noting that one of the proposed O-RAM solutions utilizes a technique to spread reshuffling of the hierarchical solution over time to achieve poly-logarithmic worst-case cost. However, the mechanism for achieving poly-logarithmic worst-case cost in the present invention is fundamentally different from that approach. Moreover, partitioning and background eviction techniques utilized herein are also key to the practical performance gains that are achieved by the invention.

2. Problem Definition.

FIG. 1 illustrates an example embodiment 10 of the invention considering a client storing data at a remote untrusted server while preserving its privacy and concealing access patterns. A server side 12 and client side 14 are shown, preferably communicating with each other over a network 22, such as the internet, although the system may be alternatively implemented on a large intranet having untrusted data storage. On the server side 12 a server device 16 is connected 18 with a means for storing data 20, such as a data storage subsystem. On the client side 14 a client device 24 is connected 28 with a means for storing data 26, such as a data storage subsystem. The data storage on the client and server may be any desired form of electronic data storage, such as random access memory (RAM), hard disk drive (HDD), solid state disk (SSD), other forms of storing digital data and any combinations thereof. It will be appreciated that server 12 and client 24 each comprise one or more computer processors which perform steps described in the present invention in response to programming stored in memory and executable on the client/server computers. The programming may be retrieved from computer readable media for execution on the respective client and server devices. The present invention is non-limiting with regard to the types of computer and memory devices utilized in the client and server, insofar as these are non-transitory, and thus not constituting a transitory electronic signal.

While traditional encryption schemes can provide confidentiality, they do not hide the data access pattern which can reveal very sensitive information to the untrusted server. It is considered that the server is untrusted, and the client is trusted as the data originates on the client side, it is their data. The trusted side 14 includes the computer in client 24 and client side storage 26. It will be appreciated that data storage 20, 26 for the server and client may comprise any desired form of memory devices, such as RAM, hard disk drives, other data storage forms and combinations thereof.

The goal of O-RAM is to completely hide the data access pattern (which blocks were read/written) from the server. In other words, each data read or write request will generate a completely random sequence of data accesses from the server's perspective.

The data is assumed to be fetched and stored in atomic units, referred to as blocks, of size B bytes each. For example, a typical value for B for cloud storage is 64 KB to 256 KB. The notation N is utilized to denote total number of data blocks that the O-RAM can support, also referred to as the capacity of the O-RAM.

One of the design goals is to provide an Oblivious RAM method and apparatus which is practical for operating in realistic settings. Typically, bandwidth is considered more costly than computation and storage in real-world scenarios. For example, typical off-the-shelf personal computers (PCs) and laptops today have gigabytes of RAM, and several hundred gigabytes of disk storage. When deploying O-RAM in a realistic setting, it is most typical that network bandwidth and latency are the bottleneck.

As a result, the inventive Oblivious RAM construction leverages available client-side storage as a working buffer, and this allows the system to drastically optimize the bandwidth consumption between the server and the client. As a typical scenario, it is assumed that client 24 wishes to store large amounts (e.g., terabytes) of data on the remote server 16, and the client has megabytes to gigabytes of storage (in the form of RAM or disk). The present invention is directed toward leveraging client local storage to reduce O-RAM deployment overhead.

Figure 2:
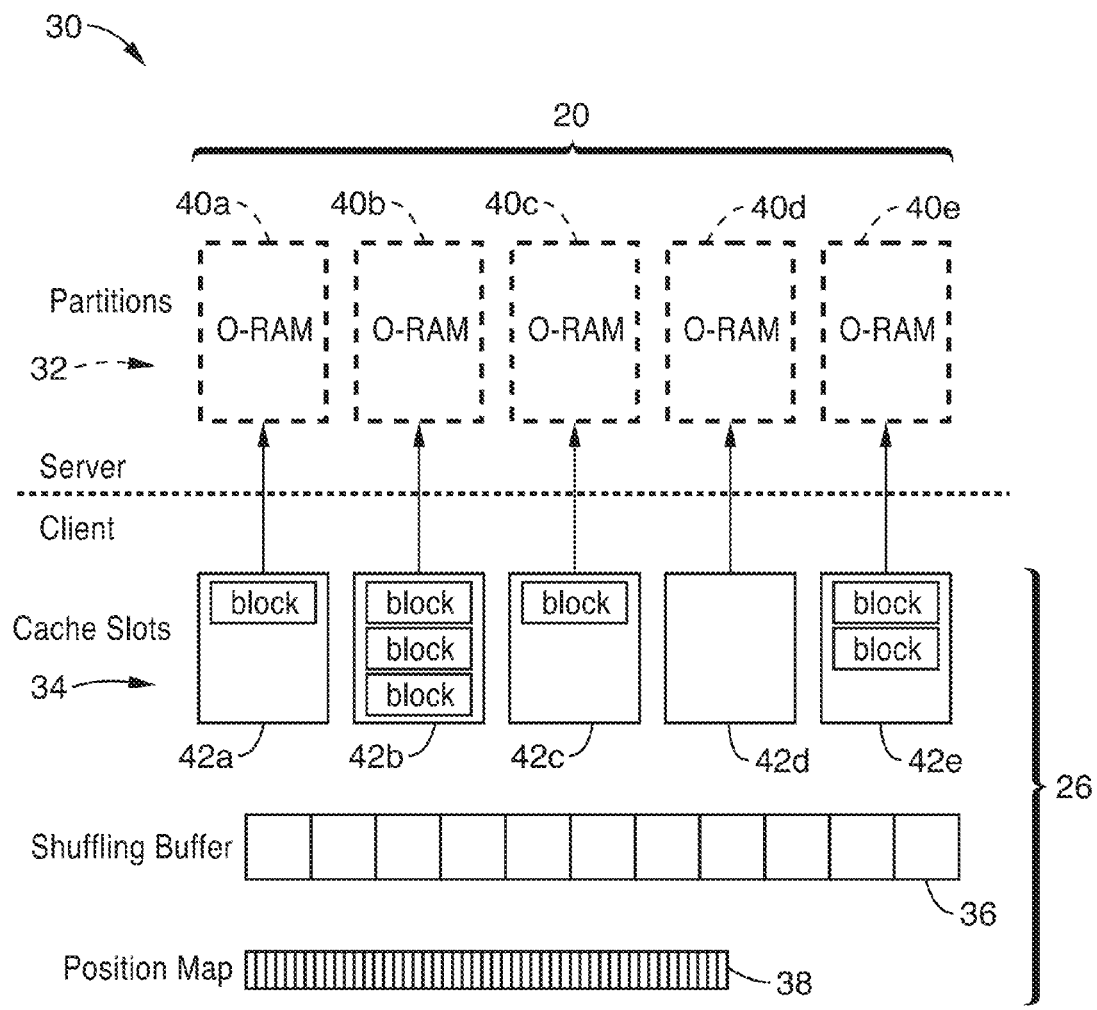
FIG. 2 is a block diagram of a partitioning framework according to an embodiment of the present invention.

FIG. 2 illustrates an example of a partitioning framework embodiment 30 for the inventive O-RAM system. A server 32 and client side 34 are seen in the figure, as were seen in FIG. 1. On server side 32 partitions 40*a* through 40*e* are shown in server storage 20 dividing up the memory that the server uses (e.g., server providing cloud storage services) in fulfilling client requests for storing data. It should be appreciated that in this figure, as well as others herein, the number of partitions, slots, blocks, positions in the shuffling buffer and position map are shown by way of simple illustration, however, the practice of the invention is not limited by the number of elements shown by illustration. On client side 34 the figure show a shuffling buffer 36, a position map 38, and a series of cache slots 42*a* through 42*e* contained within client storage 26, which was shown in FIG. 1. It will be seen in the figure that cache slots 42*a* through 42*e* correspond to partitions 40*a* through 40*e* on the server side. It should noted here that the arrows indicate the direction in which blocks are "evicted" from the cache slots to the partitions. Data does flow from the partitions to the cache slots, but the data is randomly assigned to a cache slot after it is read from a partition (see FIG. 3 line 1 and line 12). So when reading blocks get assigned to random cache slots and then later, when writing, the blocks get evicted from the cache slots to their corresponding partitions.

Cache slots 42*a* through 42*e* are for temporarily storing data blocks fetched from the server, and are depicted as containing an arbitrary number of blocks. The positions in shuffling buffer 36 are utilized when shuffling blocks when two or more levels in an O-RAM partition are to be merged into the next level. Position map 38 maintains information (tracks) on which server partition each data block is located, with fields of the position map associated with each data block and capable of containing at least a client side partition identifier. Standard security definitions for O-RAMs are generally adopted in this specification. Intuitively, maintaining O-RAM security requires that the server learns nothing about the access pattern. In other words, no information should be available (leakable) on the server side regarding: (1) which data is being accessed; (2) how old the data is (e.g., when it was last accessed); (3) whether the same data is being accessed (linkability); (4) access patterns (e.g., sequential, random, etc.,); or (5) whether the access is a read or a write. The O-RAM constructions do not consider information leakage through the timing channel, such as when or how frequently the client makes data requests.

Definition 1: (Security definition). Let $\vec{y}:=((op_1,u_1,data_1),(op_2,u_2,data_2), \ldots, (op_M,u_M,data_M),)$ denote a data request sequence of length M, where each $op_i$ denotes a read $(u_i)$ or a write $(u_i,data)$ operation. Specifically, $u_i$ denotes the identifier of the block being read or written, and $data_i$ denotes the data being written. Let $A(\vec{y})$ denote the (possibly randomized) sequence of accesses to the remote storage given the sequence of data requests $\vec{y}$. An O-RAM construction is said to be secure if for any two data request sequences $\vec{y}$ and $\vec{z}$ of the same length, their access patterns $A(\vec{y})$ and $A(\vec{z})$ are computationally indistinguishable by anyone but the client.

3. Partitioning Framework.

The following section describes partitioning as a framework, which is a principle tenet of the invention. At a high level, the goal of partitioning is to subdivide the O-RAM into much smaller partitions, so that the operations performed on the partitions can be handled much more efficiently than if the O-RAM was not partitioned.

The main challenge of partitioning the O-RAM is to ensure that the sequence of partitions accessed during the lifetime of the O-RAM appears random to the untrusted server while keeping the client-side storage small. In this way, no information about data access pattern is revealed.

3.1. Server Storage.

Partitioning divides the storage on the server into P fully functional partition O-RAM's, each containing about N/P blocks on average. Each partition of the O-RAM can be conceptually considered as a black box which exports a read and a write operation, while hiding the access patterns within that partition.

At any point of time, each block is randomly assigned to any of the P partitions. Whenever a block is accessed, the block is logically removed from its current partition (although a stale copy of the block may remain), and logically assigned to a fresh random partition selected from all P partitions. Thus, the client needs to keep track of which partition each block is associated with at any point of time, as specified in the next section.

The maximum number of blocks that an O-RAM can contain is referred to as the capacity of the O-RAM. In our partitioning framework, blocks are randomly assigned to partitions, so the capacity of an O-RAM partition has to be slightly more than N/P blocks to accommodate the variance of assignments. Due to the standard balls and bins analysis, for P=√N, each partition needs to have capacity √N+o(√N) to have a sufficiently small failure probability $$\frac{1}{poly(N)}.$$

3.2. Client Storage.

Client storage is divided into the following components.

Data cache with P slots. The data cache is a cache for temporarily storing data blocks fetched from the server. There are exactly P cache slots, equal to the number of partitions on the server. Logically, the P cache slots can be thought of as an extension to the server-side partitions. Each slot can store 0, 1, or multiple blocks. Each cache slot will have a constant number of data blocks in expectation, while the total number of data blocks in all cache slots will be bounded by O(P) with high probability. In both our theoretic and practical constructions, we will let P=√N. In this case, the data cache capacity of the client is O(√N).

Position map. As mentioned earlier, the client needs to maintain track of which partition (or cache slot) in which each block resides. The position map serves exactly this purpose. We use the notation Position[u] for the partition number where block u currently resides. In our practical construction described in Section 4, the position map is extended to also contain the exact location (level number and index within the level) of block u within its current partition.

Intuitively, each block's position (i.e., partition number) requires about c(log N) bits to describe. In our practical construction, c≤1.1, since the practical construction also stores the exact location of the block inside a partition. Hence, the position map requires at most cN(log N) bits of storage, or $$\frac{c}{8}N(\log N) \text{ bytes},$$

which is $$\frac{cN(\log N)}{8 \cdot B}$$

blocks. Since in practice the block size B>d/8 log N, the size of the position map is a fraction of the original capacity of the O-RAM (with a very small constant).

Shuffling buffer. The shuffling buffer is used for the shuffling operation when two or more levels inside a partition O-RAM need to be merged into the next level. By way of example, and not limitation, it is assumed that the shuffling buffer has size O(√N); however, it is often chosen to be $$O\left(\frac{N}{P}\right),$$

whereas when P=√N then $$O\left(\frac{N}{P}\right) = O(\sqrt{N}).$$

Miscellaneous. Finally, it should be appreciated that a certain amount of client-side storage is required to store miscellaneous states and information, such as cryptographic keys for authentication, encryption, and pseudo-random permutations.

3.3. Intuition.

In our construction, regardless of whether a block is found in the data cache of the client, the client always performs a read and a write operation to the server upon every data request—with a dummy read operation in case of a cache hit. Without this precaution, the server might be able to infer the age of the blocks being accessed. Therefore, the client data cache is utilized for security rather than for efficiency.

In some sense, the data cache acts like a holding buffer. When the client fetches a block from the server, it cannot immediately write the block back to some partition, since this would result in linkability attacks the next time this block is read. Instead, the fetched block is associated with a fresh randomly chosen cache slot, but the block resides in the client data cache until a background eviction process writes it back to the server partition corresponding to its cache slot.

Another crucial observation is that the eviction process should not reveal which client cache slots are filled and which are not, as this can lead to linkability attacks as well. To achieve this, we use an eviction process that is independent of the load of each cache slot. Therefore, we sometimes have to write back a dummy block to the server. For example, one possible eviction algorithm is to sequentially scan the cache slots at a fixed rate and evict a block from it or evict a dummy block if the cache slot is empty.

To aid in understanding the partitioning framework, it helps to think of each client cache slot i as an extension of the i-th server partition. At any point of time, a data block is associated with a random partition (or slot), and the client has a position map to keep track of the location of each block. If a block is associated with partition (or slot) i∈[P], this indicates that an up-to-date version of a block currently resides in partition i (or cache slot i). However, it is possible that other partitions (or even the same partition) may still carry a stale version of block i, which will be removed during a future reshuffling operation.

Every time a read or write operation is performed on a block, the block is re-assigned to a partition (or slot) selected independently at random from all P partitions (or slots). This ensures that two operations on the same block cannot be linked to each other.

3.4. Setup.

When the construction is initialized, we first assign each block to an independently random partition. Since initially all blocks are zeroed, their values are implicit and we don't write them to the server. The position map stores an additional bit per block to indicate if it has never been accessed and is hence zeroed. In the practical construction, this bit can be implicitly calculated from other metadata that the client stores. Additionally, the data cache is initially empty.

3.5. Partition O-RAM Semantics and Notations.

Before presenting the principle operations of our partitioning-based O-RAM, the operations supported by each partition O-RAM are defined.

Recall that each partition is a fully functional O-RAM by itself. To understand our partitioning framework, it helps to think of each partition as a blackbox O-RAM. For example, for each partition, we can plug in the Goodrich-Mitzenmacher O-RAM mechanism (with either $O(1)$ or $O(\sqrt{N})$ client-side storage) or our own partition O-RAM construction described in Section 4.

We make a few small assumptions about the partition O-RAM, and use slightly different semantics to refer to the partition O-RAM operations than existing work. Existing O-RAM constructions always perform both a read and a write operation upon any data access request. For the purpose of the partitioning framework, it helps to separate the reads from the writes. In particular, we require that a ReadPartition operation "logically remove" the fetched block from the corresponding partition. Many existing constructions can be easily modified to support this operation, simply by writing back a dummy block to the first level of the hierarchy after reading.

Formally, each partition O-RAM is thought of as a blackbox O-RAM exporting two operations, ReadPartition and WritePartition, as explained below.

ReadPartition(p,u) reads a block identified by its unique identifier $u \in \{\bot, 1, 2, \ldots, N-1\}$ from partition p. In case $u = \bot$, the read operation is called a dummy read. We assume that the ReadPartition operation will logically remove the fetched block from the corresponding partition.

WritePartition(p,u,data) writes back a block identified by its unique identifier $u \in \{\bot, 1, 2, \ldots, N-1\}$ to partition p. In case $u = \bot$, the write operation is called a dummy write. The parameter data denotes the block's data.

Remark 1. (About the dummy block identifier $\bot$). The dummy block identifier $\bot$ represents a meaningless data block. It is used as a substitute for a real block when the client does not want the server to know that there is no real block for some operation.

Remark 2. (Block identifier space). Another weak assumption we make is that each partition O-RAM needs to support non-contiguous block identifiers. In other words, the block identifiers need not be a number within [1,N], where N is the O-RAM capacity.

3.6. Reading a Block.

Let read(u) denote a read operation for a block identified by u. The client looks it up in the position map, and finds out which partition block u is associated with. Suppose that block u is associated with partition p. The client then performs the following steps:

Step 1: Read a block from partition p.

If block u is found in cache slot p, the client performs a dummy read from partition p of the server, (i.e., call ReadPartition(p,$\bot$) where $\bot$ denotes a reading a dummy block.

Otherwise, the client reads block u from partition p of the server by calling ReadPartition(p,u).

Step 2: Place block u that was fetched in Step 1 into the client's cache, and update the position map.

Pick a fresh random slot number s, and place block u into cache slot s. This means that block u is scheduled to be evicted to partition s in the future, unless another read(u) preempts the eviction of this block.

Update the position map, and associate block u with partition s. In this way, the next read(u) will cause partition s to be read and written. Afterwards, a background eviction takes place as described in Section 3.8.

3.7. Writing a Block.

Let read(u,data) denote writing data to the block identified by u. This operation is implemented as a read(u) operation with the following exception: when block u is placed in the cache during the read (u) operation, its data is set to data.

Observation 1. Each read or write operation will cause an independent, random partition to be accessed.

Proof. (sketch.) Consider each client cache slot as an extension of the corresponding server partition. Every time a block u is read or written, it is placed into a fresh random cache slot s, i.e., associated with partition Note that every time s is chosen at random, and independent of operations to the Oblivious RAM. The next time block u is accessed, regardless of whether block u has been evicted from the cache slot before this access, the corresponding partition s is read and written. As the value of the random variable s has not been revealed to the server before this, from the server's perspective s is independently and uniformly at random.

3.8. Background Eviction.

To prevent the client data cache from building up, blocks need to be evicted to the server at some point in time. There are two eviction processes:

1. Foreground evictions (Piggy-backed evictions) are those that take place by sharing regular O-RAM read or write operations (see Line 13 of FIG. 3). Basically, if the data access request operates on a block currently associated with partition p, we can piggy-back a write-back to partition p at that time. The piggy-backed evictions are optional, but their existence can improve performance by a constant factor.

2. Background evictions take place at a rate proportional to the data access rate (see Line 14 of FIG. 3). The background evictions are completely independent of the data access requests, and therefore can be equivalently thought of as taking place in a separate background thread. Our construction uses an eviction rate of $v > 0$, meaning that in expectation, v number of background evictions are attempted with every data access request. By way of example, the section below describes two processes for performing background eviction:

(a) Sequentially scan the cache slots at a fixed rate v and evict blocks in each cache slot visited during the scan. The number of blocks evicted per cache slot does not depend on the number of blocks in the cache slot, and can be a fixed number (e.g., one). (see the SequentialEvict routine in FIG. 4C);

(b) At a fixed rate v randomly select a slot from all P slots to evict from (a modified version of the random eviction algorithm is presented as RandomEvict in FIG. 4B).

Our eviction algorithm is designed to deal with two main challenges:

Bounding the cache size. To avoid the client's data cache from building up indefinitely, the above two eviction processes combined evict blocks at least as fast as blocks are placed into the cache. The actual size of the client's data cache depends on the choice of the background eviction rate v. We choose $v > 0$ to be a constant factor of the actual data request rate. For our practical construction, in Section 5.1 we empirically demonstrate the relationship of v and the cache size. It can be shown that our background eviction algorithm results in a cache size of $O(P)$.

Privacy. It is important to ensure that the background eviction process does not reveal whether a cache slot is filled, or reveal the number of blocks in a slot. For this reason, if an empty slot is selected for eviction, a dummy block is evicted to hide the fact that the cache slot does not contain any real blocks.

Observation 2. By design, the background eviction process generates a partition access sequence independent of the data access pattern.

Lemma 1: (Partition access sequence reveals nothing about the data request sequence.). Let $\vec{y}$ denote a data request sequence. Let $f(\vec{y})$ denote the sequence of partition numbers accessed given data request sequence $\vec{y}$. Then, for any two data request sequences of the same length $\vec{y}$ and $\vec{z}$, $f(\vec{y})$ and $f(\vec{z})$ are identically distributed. In other words, the sequence of partition numbers accessed during the life-time of the O-RAM does not leak any information about the data access pattern.

Proof. The sequence of partition numbers are generated in two ways: (1) the regular read or write operations, and (2) the background eviction processes. Due to observations 1 and 2, both of the above processes generate a sequence of partition numbers completely independent of the data access pattern.

Theorem 1. Suppose that each partition uses a secure O-RAM construction, then the new O-RAM construction obtained by applying the partitioning framework over P partition O-RAMs is also secure.

Proof. Straightforward conclusion from Lemma 1 and the security of the partition O-RAM.

3.9. Algorithm Pseudo-Code.

FIG. 3 and FIG. 4 describe in formal pseudo-code our O-RAM operations based on the partitioning framework. In FIG. 3 an example embodiment 50 outlines steps (1-15) for performing a data access, Access(op,u,data*). For ease of presentation, FIG. 3 shows unified read and write operations, although reads and writes can be performed by separate routines without departing from these teachings. The data block to be read or written is identified by u. If op=read, the input parameter data*=None, and the Access operation returns the newly fetched block. If op=write, the Access operation writes the specified data to the block identified by u, and returns the old value of the block u.

In FIG. 4A through FIG. 4C example embodiments 60, 70, 80 comprise pseudo-codes of steps for performing various eviction routines Evict (p) 60, RandomEvict(v) 70, and SequentialEvict(v) 80. Evict (p) 60 seen in FIG. 4A is a form of foreground (piggy-backed eviction) associated with a selected partition p that place on regular O-RAM read or write operations. RandomEvict(v) 70 seen in FIG. 4B, and SequentialEvict(v) 80 seen in FIG. 4C are background eviction algorithms with eviction rate v. The routine SequentialEvict(v) determines the number of blocks to evict num based on a prescribed distribution D(v) and sequentially scans num slots to evict from. RandomEvict(v) samples v∈N random slots (with replacement) to evict from. In both SequentialEvict(v) and RandomEvict(v), if a slot selected for eviction is empty, a dummy block is evicted for the sake of security.

4. Practical Construction.

In this section, partitioning techniques are applied (previously mentioned) to obtain a practical construction with an amortized cost within the range from approximately 20× to 35× overhead under typical settings, which is about 63 times faster than the best known previous construction. The client storage is typically 0:01% to 0:3% of the O-RAM capacity. The worst-case cost of this construction is O ($\sqrt{N}$), and it is shown later how to allow concurrent shuffling and reads to reduce the worst-case cost to O(log N) (Section 6).

While the practical construction requires cN client-side storage, the constant u is so small that our cN value is smaller than or comparable to $\sqrt{N}$ for typical storage sizes ranging from gigabytes to terabytes. In Section 7 is shown recursively applying the inventive Oblivious RAM construction to reduce client-side storage to O($\sqrt{N}$) while incurring only a logarithmic factor in the amortized cost.

4.1. Overview.

Our practical construction uses the partitioning framework (Section 3). For the partitions, we use our own highly optimized O-RAM construction which somewhat resembles the Pinkas-Reinman O-RAM at a very high level.

Choice of parameters. In this practical construction, we choose P=$\sqrt{N}$ partitions, each with $\sqrt{N}$ blocks on average. We use SequentialEvict routine for background eviction. Every time SequentialEvict is invoked with an eviction rate of v, it decides the number of blocks to evict num based on a bounded geometric distribution with mean v, i.e., let c be a constant representing the maximum number of evictions per data access operation, then Pr[num=k]$\propto p^k$ for 0≤k≤c, and Pr[num=k]=0 for k>c. Here 0<p<1 is a probability dependent on v and c.

As mentioned earlier, the piggybacked evictions enable practical savings up to a constant factor, so we use piggybacked evictions in this construction.

Optimized Partition O-RAM Construction.

While any existing O-RAM construction satisfying the modified ReadPartition and WritePartition semantics can be used as a partition O-RAM, we have developed our own highly optimized partition O-RAM. Our partition O-RAM construction resembles the Pinkas-Reinman O-RAM at a very high level, but with several optimizations to gain practical savings. The practical savings come from at least three sources, in comparison with the Pinkas-Reinman construction:

(1) Local sorting. Due to our partitioning framework, each partition is now of size O($\sqrt{N}$) blocks. This allows us to use a client shuffling buffer of size O($\sqrt{N}$) blocks to reshuffle the partition locally, thereby eliminating the need for extremely expensive oblivious sorting procedures during a reshuffling operation. This is our most significant source of saving in comparison with all other existing schemes.

(2) No Cuckoo hashing. Second, since we use a position map to save the locations of all blocks, we no longer need Cuckoo hashing, thereby saving a 2× factor for lookups.

(3) Compressed data transfer during reshuffling. Third, during the reshuffling operation, the client only reads blocks from each level that have not been previously read. Also, when the client writes back a set of shuffled blocks to the server (at least half of which are dummy blocks), it uses a compression algorithm to compress the shuffling buffer down to half its size. These two optimizations save about another 2× factor.

(4) Latency reduction. In the practical construction, the client saves a position map which records the locations of each block on the server. This allows the client to query the O(log N) levels in each partition in a single round-trip, thereby reducing the latency to O(1).

4.2. Partition Layout.

As mentioned earlier, we choose P=$\sqrt{N}$ partitions for the practical construction. Each partition consists of $$L = \log_2(\sqrt{N}) + 1 = \frac{1}{2}\log_2 N + 1$$

levels, indexed by $$0, 1, \ldots, \frac{1}{2}\log_2 N$$

respectively. Except for the top level, each level l has $2 \cdot 2^l$, among which at most half are real blocks, and the rest (at least half) are dummy blocks.

The top level where $$l = \frac{1}{2}\log_2 N$$

has $2 \cdot 2^l + \epsilon = 2\sqrt{N} + \epsilon$ blocks, where the surplus $\epsilon$ is due to the fact that some partition may have more blocks than others when the blocks are assigned in a random fashion to the partitions. Due to a standard balls and bins argument, the maximum size of each partition, including real and dummy blocks, should be $4\sqrt{N} + o(\sqrt{N})$ such that the failure probability is given by $$\frac{1}{poly(N)}.$$

In Section 5.3 we empirically demonstrate that in practice, the maximum number of real blocks in each partition is not more than $1.15\sqrt{N}$ for $N \geq 20$, hence the partition capacity is no more than $4 \cdot 1.15\sqrt{N} = 4.6\sqrt{N}$ blocks, and the total server storage is no more than 4.6N blocks. In Section 8.2, optimizations are described that reduce server storage to less than 3.2N blocks.

At any given time, a partition on the server might have some of its levels filled with blocks and others unfilled. The top partition is always filled. Also, a data block can be located in any partition, any filled level, and any offset within the level. In the practical construction, we extend the position map of the partition framework to also keep track of the level number and offset of each block.

From the perspective of the server, all blocks within a level are pseudo-randomly arranged. Because the blocks are encrypted, the server cannot even tell which blocks are real and which ones are dummy. We use keyed pseudo-random permutation (PRP) function for permuting blocks within a level in our construction. When the context is clear, we omit the range or the PRP function in the pseudo-code.

4.3. Setup.

The following describes a way of filling levels by way of example, and not by way of limitation. It should be appreciated that filling may be performed during setup in many different ways without departing from the teachings of the inventive. The initial set of filled levels that contain the blocks depends on the partition number p. In order to better amortize the reshuffling costs of our scheme, the client randomly chooses which levels of each partition will be initially filled (with the restriction that the top level is always filled). Note that there are $2^{L-1}$ such possible fillings of a partition where L is the number of levels in the partition. The client notifies the server which levels are filled but does not write the actual blocks to the server because the blocks are initially zeroed and their values can be calculated implicitly by storing one bit for each level of each partition. This bit indicates if the entire level has never been reshuffled and is hence zeroed.

4.4. Reading from a Partition.

FIG. 5 illustrates an example embodiment 90 of a practical ReadPartition operation for reading the block with id u from partition p. If $u \neq \perp$, then the ReadPartition operation is a dummy read and a dummy block is read from each filled level. If $u \neq \perp$, block u is read from the level that contains it, and a dummy block is read from each of the other filled levels. Note that all of the fetches from the server are performed in parallel and hence this operation has single round trip latency unlike existing schemes which take $\Omega(\log N)$ round trips.

4.5. Writing to a Partition.

Figure 6:
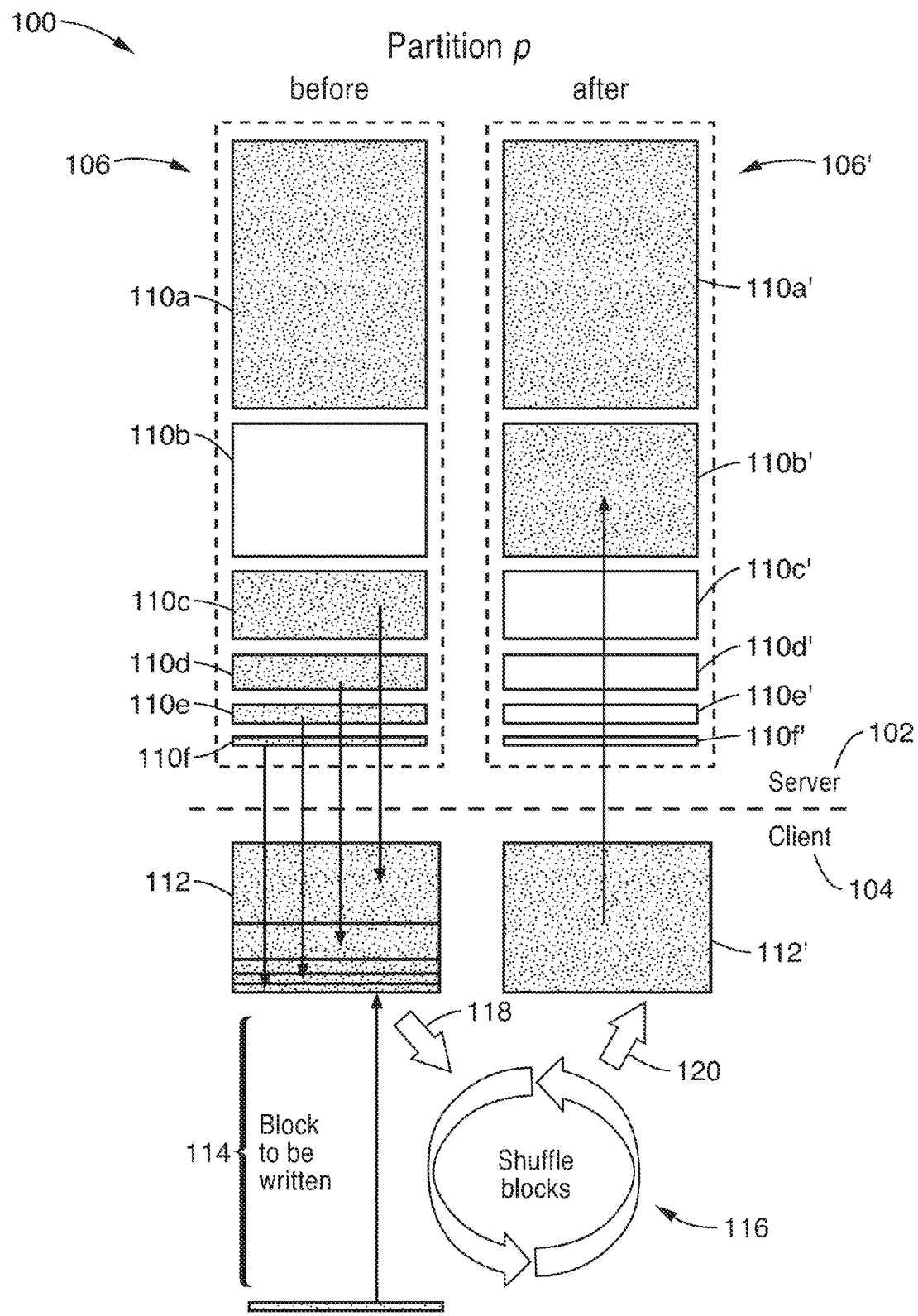
FIG. 6 is a block diagram of a write partition process according to an embodiment of the present invention.

FIG. 6 illustrates an example embodiment 100 showing how a WritePartition operation carried out between server 102 and client 104 leads to shuffling of consecutively filled levels into the first empty level.

Partitions are seen before 106 and after 106' a write partition operation. Each write to a partition is essentially a reshuffling operation performed on consecutively filled levels in a partition. Therefore, we sometimes use the terms "write" and "shuffling" (or "reshuffling") interchangeably.

In general FIG. 6 illustrates a shuffling process in which all consecutively filled levels from the bottom upwards are read in for shuffling and the next unfilled level is the destination where the result of the shuffling is stored. In the case when all levels are filled, the resulting level is the top level (even though it was filled before the shuffling). The levels of a partition that are being shuffled depend on which levels of the partition are filled before shuffling, and can range from zero to the all levels.

The figure shows blocks 110a through 110f before a write partition, and the corresponding locations 110a' through 110f' after the write partition.

First, unread blocks 110c, 110d, 110e and 110f from consecutively filled levels of the partition are read from the server into the client's shuffling buffer 112 as blocks to be written 114. A shuffling operation 116 is shown with blocks being received 118 for shuffling, and blocks being output 120 after shuffling into shuffling buffer 112'. The client preferably permutes the shuffling buffer according to a pseudo-random permutation (PRP) function to effect (perform) shuffling, however, it should be appreciated that other forms of shuffling may be performed without departing from the invention. Furthermore, if PRP is not utilized, then it may be necessary to store additional information in the position map that specifies the reordered positions of the blocks. Finally, the client uploads its shuffling buffer 112' into the first unfilled level 110b', and marks all of the levels below it, 110c', 110d', 110e' and 110f, as unfilled.

Figure 23:
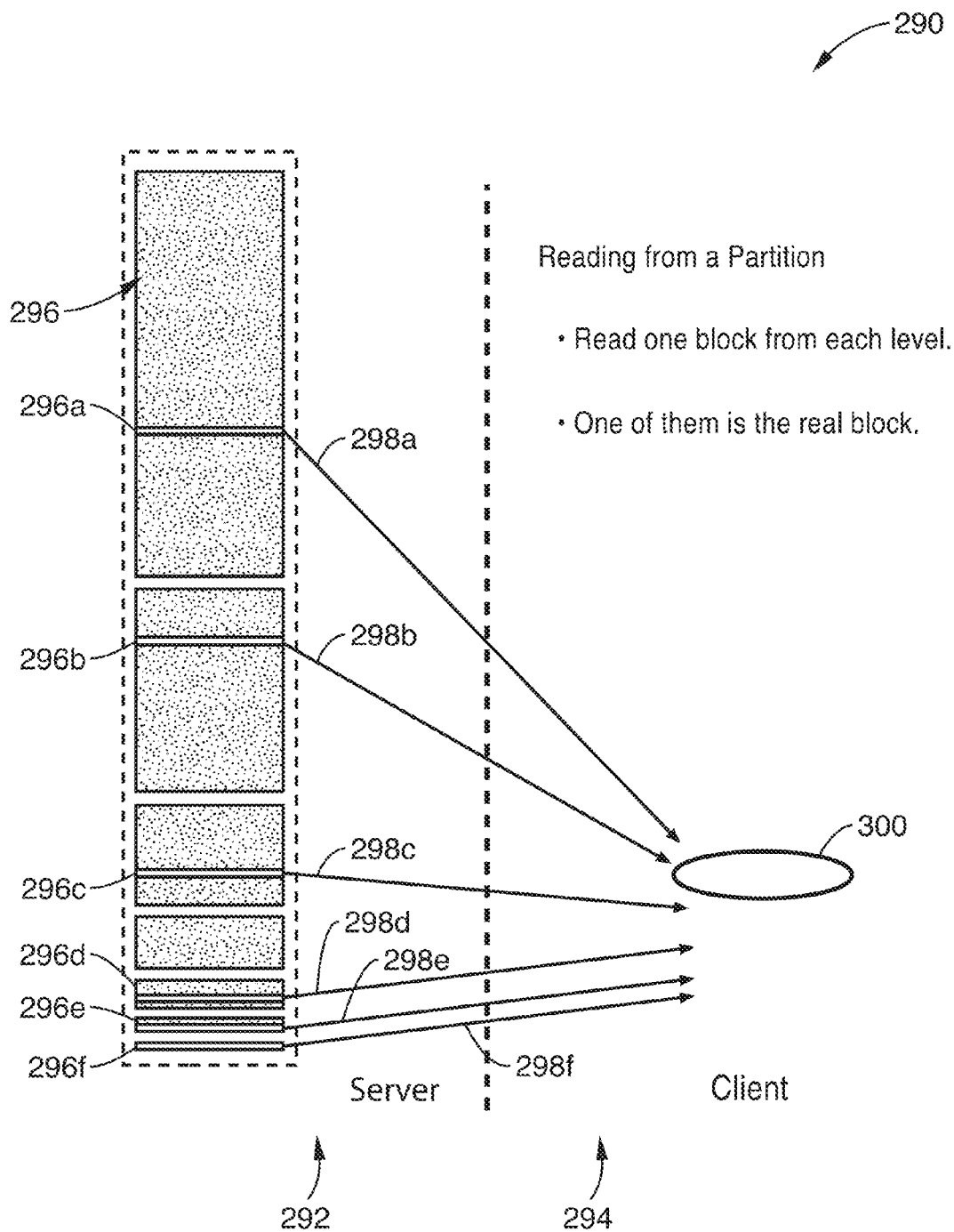
FIG. 23 is a block diagram showing blocks read from many partitions, while only one of them is a real read, according to an embodiment of the present invention.

To understand the read operation see the example embodiment 290 seen in FIG. 23 showing a client 294 reading from a partition 296 on a server 292. In this diagram one sees that one block (296a through 296f) is read (298a through 298f) from each level, with one of them being the real block 300.

FIG. 7 illustrates an example embodiment 130 of a practical WritePartition operation for writing block data with id u into partition p.

There is an exception when all levels of a partition are filled. In that case, the reshuffling operation is performed on all levels, but at the end, the top level (which was already filled) is overwritten with the contents of the shuffling buffer and the remaining levels are marked as unfilled. Note that the shuffling buffer is never bigger than the top level because only unread real (not dummy) blocks are placed into the shuffling buffer before it is padded with dummy blocks. Since the top level is big enough to contain all of the real items inside a partition, it can hold the entire shuffling buffer.

During a reshuffling operation, the client uses the pseudo-random permutation PRP to determine the offset of all blocks (real and dummy) within a level on the server. Every time blocks are shuffled and written into the next level, the client generates a fresh random PRP key K[p,l] so that blocks end up at random offsets every time that level is constructed. The client remembers the keys for all levels of all partitions in its local cache.

4.6 Reading Levels During Shuffling.

When the client reads a partition's levels into the shuffling buffer (Line 5 of FIG. 7), it reads exactly $2^l$ previously unread blocks. Unread blocks are those that were written during a WritePartition operation when the level was last constructed, but have not been read by a ReadPartition operation since then. The client only needs to read the unread blocks because the read blocks were already logically removed from the partition when they were read. There is a further restriction that among those $2^l$ blocks must be all of the unread real (non-dummy) blocks. Since a level contains up to 2l real blocks, and there are always at least $2^l$ unread blocks in a level, this is always possible.

The client can compute which blocks have been read/unread for each level. It does this by first fetching from the server a small amount of metadata for the level that contains the list of all blocks (read and unread) that were in the level when it was last filled. Then the client looks up each of those blocks in the position map to determine if the most recent version of that block is still in this level. Hence, the client can obtain the list of unread real blocks. The offsets of the unread dummy blocks can be easily obtained by repeatedly applying the PRP function to nextDummy and incrementing nextDummy. Note that for security, the offsets of the $2^l$ unread blocks must be first computed and then the blocks must be read in order of their offset (or some other order independent of which blocks are real/dummy).

4.7. Security.

Our practical construction has the following security guarantees: obliviousness (privacy), confidentiality, and authentication (with freshness).

Theorem 2. The practical construction is oblivious according to Definition 1.

Theorem 3. The practical construction provides confidentiality and authentication (with freshness) of all data stored on the server.

It should be noted that although our partition O-RAM construction resembles the Pinkas-Reinman construction, it does not have the security flaw discovered by Goodrich and Mitzen-macher because it does not use Cuckoo hash tables.

5. Experimental Results.

For our experiments, we implemented a simulator of our construction. Each read/write operation is simulated and the simulator keeps track of exactly where each block is located, the amount of client side storage used, and the total bytes transferred for all communication between the client and server. We also implemented a simulator for the best previously known O-RAM scheme for comparison.

For each parameterization of our O-RAM construction, we simulated exactly 3N read/write operations. For example, for each O-RAM instances with $N=2^{28}$ blocks, we simulated about 800 million operations. We used a round-robin access pattern which maximizes the size of the client's data cache of our construction by maximizing the probability of a cache miss. Therefore, our results always show the worst case cache size. Also, because our construction is oblivious, our amortized cost measurements are independent of the simulated access pattern. We used the level compression, server storage reduction, and piggy-backed eviction optimizations described in Section 8.

5.1. Client Storage and Bandwidth.

In this experiment, we measure the performance overhead (or bandwidth overhead) of our O-RAM. An O-RAM scheme with a bandwidth overhead of w performs w times the data transfer as an unsecured remote storage protocol. In the experiments we ignore the metadata needed to store and fetch blocks because in practice it is much smaller than the block size. For example, we may have 256 KB blocks, but the metadata will be only a few bytes.

In our scheme, the bandwidth overhead depends on the background eviction rate, and the background eviction rate determines the client's cache size. The client is free to choose its cache size by using the appropriate eviction rate.

Figure 8:
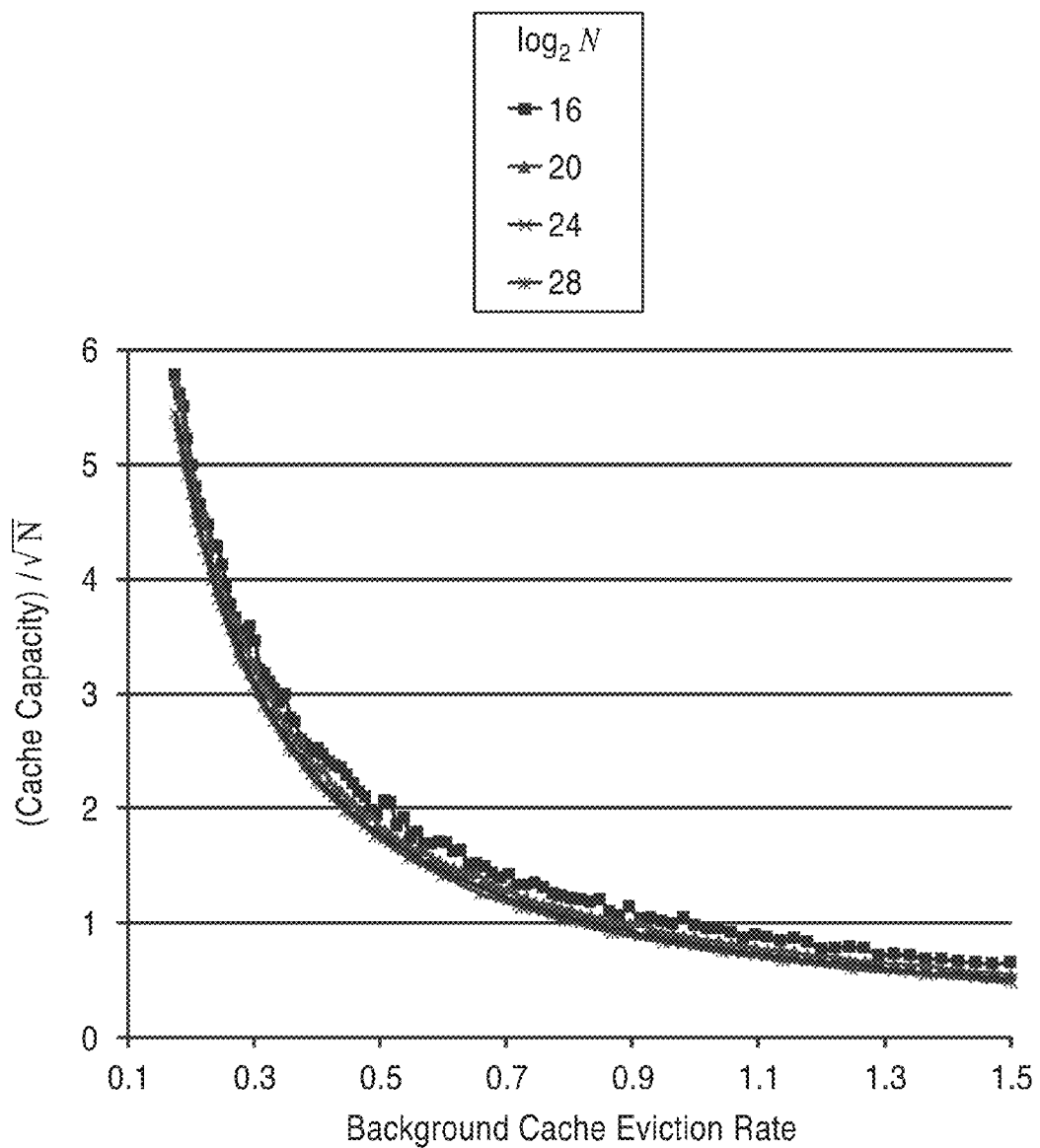
FIG. 8 is a graph of the background eviction rate with respect to cache capacity for an embodiment of the present invention.

FIG. 8 depicts the correlation between the background eviction and cache size as measured in our simulation, with cache capacity shown with respect to background cache eviction rate.

Once the client chooses its cache size, it has determined the total amount of client storage. As previously mentioned, our scheme requires $O(\sqrt{NB})$ bytes of client storage plus an extra cNB bytes of client storage for the position map with a very small constant. For most practical values of N and B, the position map is much smaller than the remaining $O(\sqrt{NB})$ bytes of client storage, so the client storage approximately scales like $O(\sqrt{NB})$ bytes. We therefore express the total client storage as $k\sqrt{NB}$ bytes. Then, we ask the question: How does the client's choice of k affect the bandwidth overhead of our entire O-RAM construction?

Figure 9:
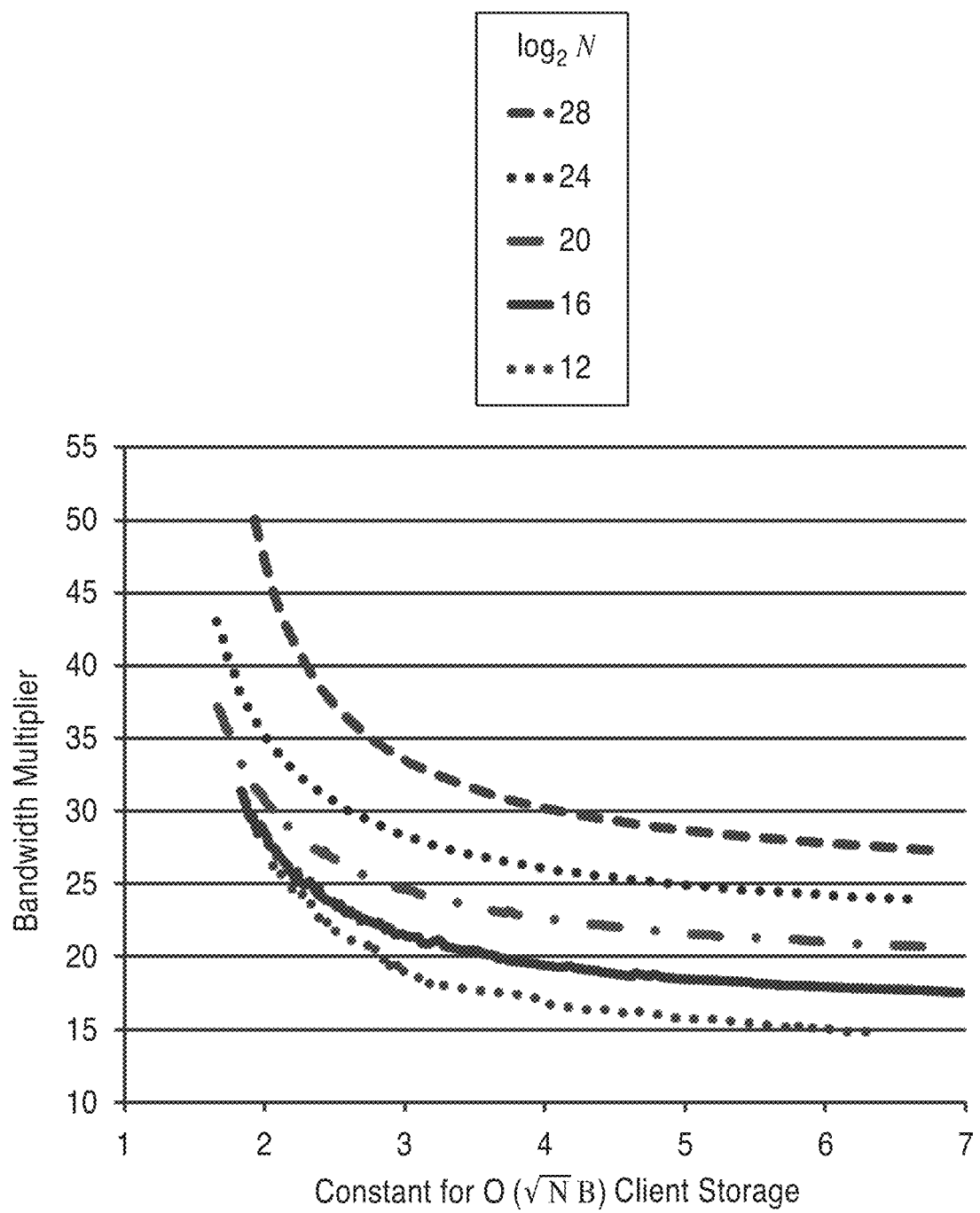
FIG. 9 is a graph of tradeoff between client storage and bandwidth for an embodiment of the present invention.

FIG. 9 depicts the trade-off between total client storage and the bandwidth overhead.

5.2. Comparison with Previous Work.

To the best of our knowledge, the most practical existing O-RAM construction was developed by Goodrich et al. It works by constructing a hierarchy of Cuckoo hash tables via Map-Reduce jobs and an efficient sorting algorithm which utilizes $N^a$ (a<1) blocks of client-side storage. We implemented a simulator that estimates a lower bound on the performance of their construction. Then we compared it to the simulation of our construction. To be fair, we parameterized both ours and their construction to use the exact same amount of client storage: $4\sqrt{NB}$ bytes. The client storage includes all of our client data structures, including our position map (stored uncompressed). We parameterized both constructions for exactly 1 TB O-RAM capacity (meaning that each construction could store a total of 1 TB of blocks). We varied the number of blocks from $N=2^{16}$ to $N=2^{24}$. Since the O-RAM size was fixed to 1 TB, the blocks size varied between $B=2^{24}$ bytes and $B=2^{16}$, with Table 3 showing the results. As it can be seen, our construction uses 63 to 66 times less bandwidth than the best previously known scheme for the exact same parameters.

5.3. Partition Capacity.

Finally, we examined the effects of splitting up the Oblivious RAM into partitions. Recall that in our practical construction with N blocks, we have split up the server storage into $\sqrt{N}$ partitions each containing about $\sqrt{N}$ blocks. Since the blocks are placed into partitions uniformly randomly rather than uniformly, a partition might end up with slightly more or less than $\sqrt{N}$ blocks. For security reasons, we want to hide from the server how many blocks are in each partition at any given time, so a partition must be large enough to contain (with high probability) the maximum number of blocks that could end up in a single partition.

Figure 10:
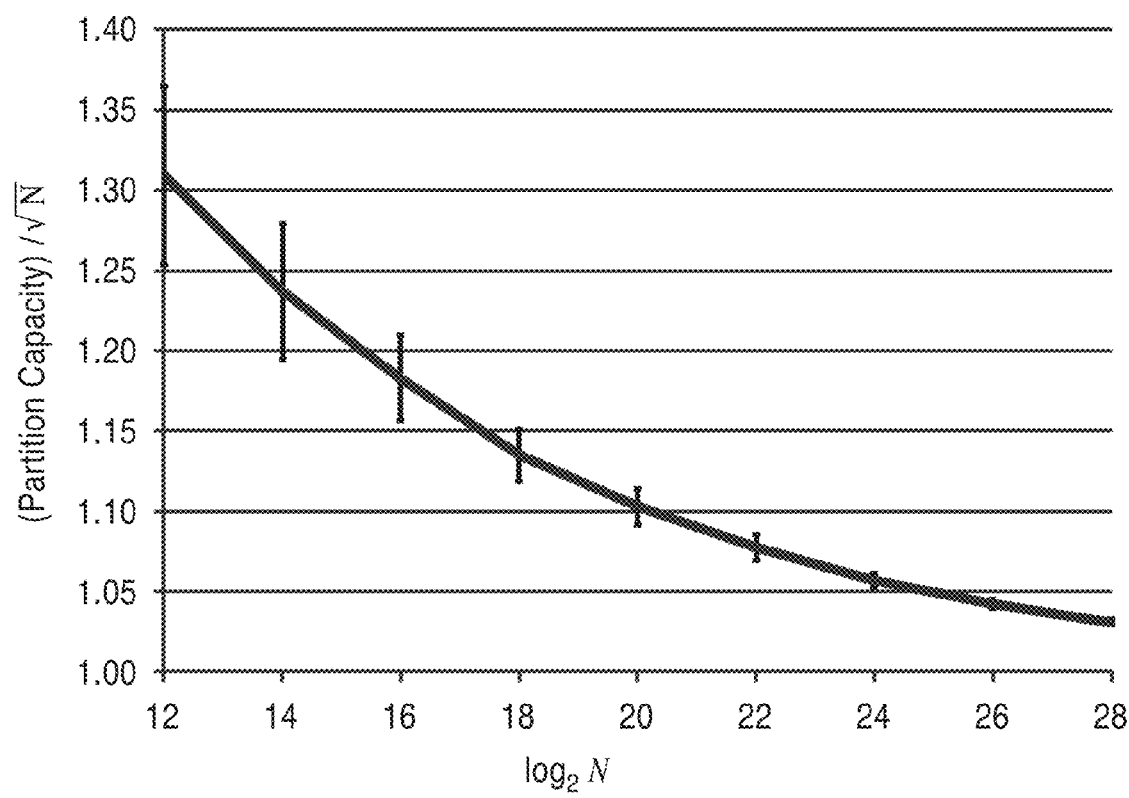
FIG. 10 is a graph of partition capacity for an embodiment of the present invention.

FIG. 10 shows how many times more blocks a partition contains than the expected number: $\sqrt{N}$. Note that as the size of the O-RAM grows, the maximum size of a partition approaches its expected size. In fact, one can formally show that the maximum number of real data blocks in each partition over time is $\sqrt{N}+o(\sqrt{N})$. Hence, for large enough N, the partition capacity is less than 5% larger than $\sqrt{N}$ blocks.

6. Reducing Worst-Case Cost with Concurrency.

The constructions described thus far have a worst-case cost $O(\sqrt{N})$ because a WritePartition operation sometimes causes a reshuffling of $O(\sqrt{N})$ blocks. We reduce the worst-case cost by spreading out expensive WritePartition operations of $O(\sqrt{N})$ cost over a long period of time, and at each time step performing $O(\log N)$ work.

To achieve this, we allow reads and writes (i.e., reshuffling) to a partition to happen concurrently. This way, an operation does not have to wait for previous long-running operations to complete before executing. We introduce an amortizer which keeps track of which partitions need to be reshuffled, and schedules $O(\log N)$ work (or $O((\log N)^2)$ for the theoretic recursive construction) per time step. There is a slight storage cost of allowing these operations to be done in parallel, but we will later show that concurrency does not increase the asymptotic storage and amortized costs of our constructions.

By performing operations concurrently, we decrease the worst-case cost of the practical construction from $O(\sqrt{N})$ to $O(\log N)$ and we reduce the worst-case cost of the recursive construction from $O(\sqrt{N})$ to $O((\log N)^2)$. Our concurrent constructions preserve the same amortized cost as their non-concurrent counterparts; however, in the concurrent constructions, the worst-case cost is the same as the amortized cost. Furthermore, in the concurrent practical construction, the latency is $O(1)$ just like the non-concurrent practical construction, as each data request requires only a single round-trip to complete.

6.1. Overview.

Figure 11:
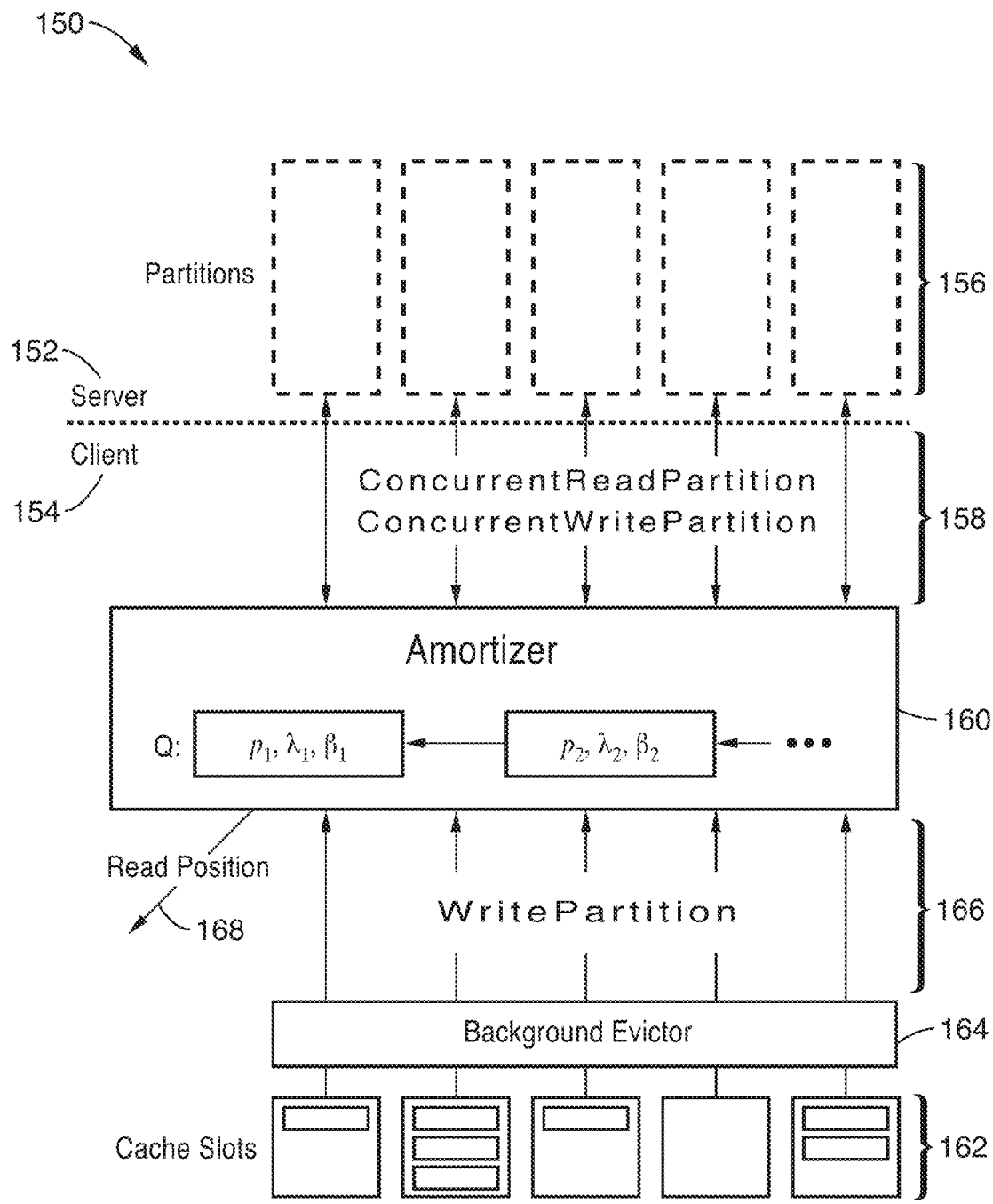
FIG. 11 is a block diagram of an amortizer within an embodiment of the present invention.

FIG. 11 illustrates an example embodiment 150 of partitioning for the access pattern concealment system which includes an amortizer 160. The system is shown with server side 152 and client side 154. Multiple storage partitions 156 are seen on the server side with concurrent partition reads and write operations 158 handled by an amortizer 160. Cache slots 162 are seen on the client coupled to a background evictor 164 which performs write partitions 166 with respect to amortizer 160, with a read partition 168 also being seen in the figure originating from amortizer 160.

We reduce the worst case cost of our constructions by inserting an Amortizer component into our system which explicitly amortizes ReadPartition and WritePartition operations.

FIG. 12 illustrates an example embodiment 170 of processing of the time step for the ReadPartition and WritePartition operations. Specifically, the Amortizer schedules a ReadPartition operation as a ConcurrentReadPartition operation, so the read can occur while shuffling. A ReadPartition always finishes in $O(\log N)$ time. Upon a WritePartition operation (which invokes the shuffling of a partition), the Amortizer creates a new shuffling "job", and appends it to a queue Q of jobs. The Amortizer schedules $O(\log N)$ amount of work to be done per time step for jobs in the shuffling queue.

If reads are taking place concurrently with shuffling, special care needs to be taken to avoid leakages through the access pattern. This will be explained in the detailed scheme description below.

Terminology. To aid understanding, it helps to define the following terminology.

Job. A job $(p,\lambda,\beta)$ denotes a reshuffling of levels $0,\ldots,\lambda$ of partition p and then writing the blocks into partition p on the server.

Job Queue Q. The job queue Q is a FIFO list of jobs. It is also possible to remove jobs that are not necessarily at the head of the queue for the purpose of merging them with other jobs, however, jobs are always added at the tail.

Partition counter. Let $C_p \in \mathbb{Z}_s$ denote a counter for partition p, where s is the maximum capacity of partition p. All operations on $C_p$ are modulus s.

Work. The work of an operation is measured in terms of the number of blocks that it reads and writes to partitions on the server.

Handling ReadPartition operations. The amortizer performs a ReadPartition(p,u) operation as a ConcurrentReadPartition(p,u) operation as defined in Sections 6.1.1 for the practical and recursive constructions respectively. If block u is cached by a previous ConcurrentReadPartition(p,u) operation, then it is instead read from $\beta$ where $(p,\lambda,\beta) \in Q$ for some $\lambda$ and $\beta$.

Handling WritePartition operations. The amortizer component handles a WritePartition operation by adding it to the job queue Q. The job is later dequeued in some time step and processed (possibly across multiple time steps). If the queue already has a job involving the same partition, the existing job is merged with the new job for the current WritePartition operation. Specifically, if one job requires shuffling levels $0,\ldots,\lambda$ and the other job requires shuffling levels $0,\ldots,\lambda'$, we merge the two jobs into a job that requires shuffling levels $0,\ldots,\max(\lambda,\lambda')$. We also merge the blocks to be written by both jobs.

Processing Jobs from the Job Queue.

For each time step, the reshuffling components perform $w(\log N)$ for a predetermined constant w such that $w(\log N)$ is greater than or equal to the amortized cost of the construction. Part of that work may be consumed by a ConcurrentReadPartition operation executing at the beginning of the time step as described in FIG. 12. The remaining work is performed in the form of jobs obtained from Q.

Definition 2 (Processing a job). A job $(p,\lambda,\beta)$ is performed as a ConcurrentReadPartition $(p,\lambda,\beta)$ operation that reshuffles levels $0,\ldots,\lambda$ of partition p and writes the blocks in $\beta$ to partition p. The ConcurrentReadPartition operation is described in Sections 6.1.2 for the practical and recursive constructions respectively. Additionally, every block read and written to the server is counted to calculate the amount of work performed as the job is running. A job may be paused after having completed part of its work.

Jobs are always dequeued from the head of Q. At any point only a single job called the current job is being processed unless the queue is empty (then there are no jobs to process). Each job starts after the previous job has completed, hence multiple jobs are never processed at the same time.

If the current job does not consume all of the remaining work of the time step, the next job in Q becomes the current job, and so on. The current job is paused when the total amount of work performed in the time step is exactly $w(\log N)$. In the next time step, the current job is resumed from where it was paused.

We now explain how to perform ConcurrentReadPartition and ConcurrentWritePartition operations in the practical construction to achieve an $O(\log N)$ worst-case cost with high probability.

6.1.1. Concurrent Reads.

The client performs the ConcurrentReadPartition(p,u) operation by reading 0 or 1 blocks from each filled level l of partition p on the server as follows:

If level l in partition p contains block u, then: Read block u from level l in partition p on the server like in the ReadPartition operation.

If level l in partition p does not contain block u and this level is not being reshuffled, then Read the next dummy block from level l in partition p on the server like in the ReadPartition operation.

If level l in partition p does not contain block u and this level is being reshuffled, then Recall that when level l is being reshuffled, $2^l$ previously unread blocks are chosen to be read. Let S be the identifiers of that set of blocks for level l in partition p.

Let $S' \subseteq S$ be the IDs of blocks in S that were not read by a previous ConcurrentReadPartition operation after the level started being reshuffled. The client keeps track of S' for each level by first setting it to S when a ConcurrentReadPartition operation begins and then removing u from S' after every ConcurrentReadPartition(p,u) operation.

If S' is not empty, the client reads a random block in S' from the server.

If S' is empty, then the client doesn't read anything from level l in partition p. Revealing this fact to the server does not affect the security of the construction because the server already knows that the client has the entire level stored in its reshuffling buffer.

When $u=\perp$, block u is treated as not being contained in any level. Due to concurrency, it is possible that a level of a partition needs to be read during reshuffling. In that case, blocks may be read directly from the shuffling buffer of the client containing the level.

6.1.2. Concurrent Writes.

A ConcurrentWritePartition(p,$\lambda$,$\beta$) operation is performed like the non-concurrent WritePartition operation described in FIG. 7, except for three differences.

The first difference is that the client does not shuffle based on the last consecutively filled level. Instead it shuffles the levels $0, \ldots, \lambda$, which may include a few more levels than the WritePartition operation would shuffle.

The second difference is that at Line 9 of FIG. 7, the client adds all of the blocks in $\beta$ to the buffer.

The third difference is at Line 4 of FIG. 7. In the non-concurrent construction, client fetches the list of $2^l$ blocks ID's in a level that is about to be reshuffled. It then uses this list to determine which blocks have already been read as described in Section 4.5. Because $2^l$ is $O(\sqrt{N})$ fetching this metadata in the non-concurrent construction takes $O(\sqrt{N})$ work in the worst case.

To ensure the worst case cost of the concurrent construction is O(log N), the metadata is stored as a bit array by the client. This bit array indicates which real blocks in that level have already been read. The client also knows which dummy blocks have been read because it already stores the next Dummy counter and it can apply the PRP function for all dummy blocks between k+1 and nextDummy where k is the number of real blocks in a level. Observe that the client only needs to store a single bit for each real block on the server. Hence this only increases the client storage by $2N+\epsilon\sqrt{N}$ bits, which is significantly smaller than the size of index structure that the client already stores.

Theorem 4 (Practical concurrent construction). With $$1 - \frac{1}{poly(N)}$$

probability, the concurrent practical construction described above has O(log N) worst-case and amortized cost, and requires cN client-side storage with a very small c, and O(N) server-side storage.

7. Recursive Construction.

The practical (non-current and concurrent) constructions described so far are geared towards optimal practical performance. However, they are arguably not ideal in terms of asymptotic performance, since they require a linear fraction of client-side storage for storing a position map of linear size.

In this section we describe how the system recursively applies our O-RAM constructions to store the position map on the server, thereby obtaining O-RAM constructions with $O(\sqrt{N})$ client-side storage, while incurring only a logarithmic factor in terms of amortized and worst-case cost.

We first describe the recursive, non-concurrent construction which achieves $O((\log N)^2)$ amortized cost, and $O(\sqrt{N})$ worst-case cost. We then describe how to apply the concurrency techniques to further reduce the worst-case cost to $O((\log N)^2)$, such that the worst-case cost and amortized cost will be the same.

7.1. Recursive Non-Concurrent Construction.

Figure 13:
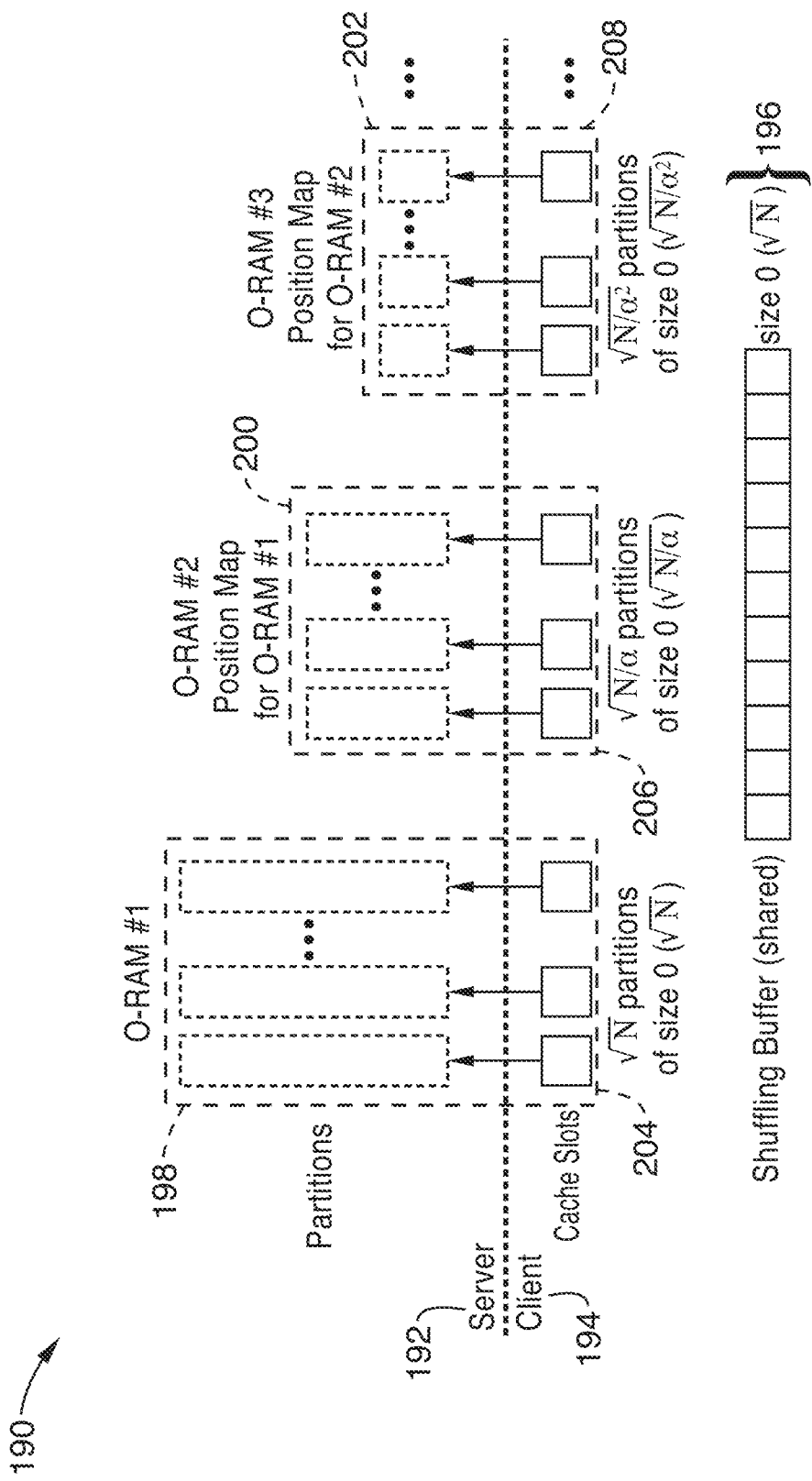
FIG. 13 is a block diagram of a recursive construction of the system according to an embodiment of the present invention.

FIG. 13 illustrates an example recursive construction embodiment 190. The server side 192 is exemplified with a plurality of O-RAMs (partition groups) 198, 200 and 202 each having inner O-RAMs as partitions. On the client side 194 cache slots are seen associated with each of these O-RAMs within groups 204, 206 and 208. The client side 194 also shows a shared shuffling buffer 196. As seen in the figure, the position map for O-RAM 198 is stored on O-RAM 200, while client position map for O-RAM 200 is stored on O-RAM 202, and so forth. Accordingly, each of the partition groups is just an instance of the O-RAM process of the invention. One should appreciate that the position map of an O-RAM is replaced with another O-RAM and so forth (recursion), while the remainder of the O-RAM method processing remains the same. Captions below each O-RAM indicate the number of partitions the O-RAM has and how many blocks are in each of those partitions.

Intuition. Instead of storing the linearly sized position map locally, the client stores it in a separate O-RAM on the server. Furthermore, the O-RAM for the position map is guaranteed to be a constant factor smaller than the original O-RAM. In other words, each level of recursion reduces the O-RAM capacity by a constant factor. After a logarithmic number of recursions, the size of the position map stored on the client is reduced to O(1). The total size of all data caches is $O(\sqrt{N})$, hence the construction uses $O(\sqrt{N})$ client storage.

For the recursive construction, we employ the Goodrich-Mitzenmacher O-RAM scheme as the partition O-RAM. Specifically, we employ their O-RAM scheme which for an O-RAM of capacity N, achieves O(log N) amortized cost and O(N) worst-case cost, while using $O(\sqrt{N})$ client-side storage, and O(N) server-side storage.

Definition 3 (O-RAM$_{GM}$). Let O-RAM$_{GM}$ denote the Goodrich-Mitzenmacher O-RAM scheme for an O-RAM of capacity N, the O-RAM$_{GM}$ scheme achieves O(log N) amortized cost, and O(N) worst-case cost, while using $O(\sqrt{N})$ client-side storage, and O(N) server-side storage.

Definition 4 (O-RAM$_{base}$). Let O-RAM$_{base}$ denote the O-RAM scheme derived through the partitioning framework with the following parameterizations: (1) we set P=$\sqrt{N}$ denote the number of partitions, where each partition has approximately $\sqrt{N}$ blocks, and (2) we use the O-RAM$_{GM}$ construction as the partition O-RAM.

Notice that in O-RAM$_{base}$, the client requires a data cache of size O($\sqrt{N}$) and a position map of size less than $$\frac{2N(\log N)}{B}$$

blocks. If we assume that the data block size B>2 log N, then the client needs to store at most $$\frac{2N(\log N)}{B} + \sqrt{N} \log N = \frac{N}{\alpha} + o(N)$$

blocks of data, where the compression rate $$\alpha = \frac{B}{2\log N}.$$

To reduce the client-side storage, we can recursively apply the O-RAM construction to store the position map on the server side.

Definition 5 (Recursive construction: O-RAM*). Let O-RAM* denote a recursive O-RAM scheme constructed as below. In O-RAM$_{base}$, the client needs to store a position map of size cN (c<1). Now, instead of storing the position map locally on the client, store it in a recursive O-RAM on the server side. The pseudo code of the O-RAM* scheme would be otherwise be the same as in FIG. 3 except that Line 2 is modified to the following recursive O-RAM lookup and update operation:

The position[u] is stored in block u/α of the smaller O-RAM. The client looks up this block, updates the corresponding entry position[u] with the new value r, and writes the new block back. Note that the read and update can be achieved in a single O-RAM operation to the smaller O-RAM.

Theorem 5 (Recursive O-RAM construction). Suppose that the block size B>2 (log N), and that the number of data accesses M<N$^k$ for some $$k = O\left(\frac{\sqrt{N}}{\log N}\right).$$

Our recursive O-RAM construction achieves O((log N)$^2$) amortized cost, O($\sqrt{N}$) worst-case cost, and requires O(N) server-side storage, and O($\sqrt{N}$) client-side storage.

7.2. Recursive Concurrent Construction.

Using similar concurrency techniques as in Section 6, we can further reduce the worst-case cost of the recursive construction to O((log N)$^2$).

Recall that the recursive construction differs from the practical construction in two ways: (1) it uses the O-RAM$_{GM}$ (Goodrich-Mitzenmacher) scheme as the partition O-RAM and (2) it recurses on its position map. We explain how to perform concurrent operations in the O-RAM$_{GM}$ scheme to reduce the worst case cost of the base construction to O(log N) with high probability. Then when the recursion is applied, the recursive construction achieves a worst case cost of O((log N)$^2$) with high probability.

7.2.1. ConcurrentReads.

As concurrency allows reshuffles to be queued for later, it is possible that a level l is read more than 2$^l$ times in between reshufflings. The O-RAM$_{GM}$ scheme imposes a restriction that at most 2$^l$ blocks can be read from a level before it must be reshuffled by using a set of 2$^l$ dummy blocks. We observe that it is possible to perform a dummy read operation instead of using a dummy block and performing a normal read on it. This essentially eliminates the use of dummy blocks. Note that the same idea was suggested in the work by Goodrich et al.

A dummy read operation ConcurrentReadPartition(p,⊥) is performed by reading two random blocks within a level instead of applying a Cuckoo hash on an element from small domain. Observe that the Cuckoo hashes for real read operations output uniformly random block positions. Because the blocks read by dummy read operation are also chosen from a uniformly random distribution, dummy reads are indistinguishable from real reads.

This observation allows the client to securely perform a ConcurrentReadPartition(p,u) operation as follows. For each level (from smaller to larger) of partition p, as usual the client performs a Cuckoo hash of the block identifier u to determine which two blocks to read within the level. Once the block is found in some level, the client performs dummy reads on subsequent levels. The client always first checks the local storage to see if the block is in the job queue. If so, then the client performs dummy reads of all levels.

In summary, instead of reading specific dummy blocks (which can be exhausted since there are only 2$^l$ dummy blocks in level l, the client performs dummy reads by choosing two random positions in the level.

7.2.2. Concurrent Writes.

In the concurrent recursive construction, the ConcurrentWritePartition(p,⊥) operation is performed by first reshuffling levels 0, . . . , λ along with the blocks in β using the oblivious shuffling protocol of the O-RAM$_{GM}$ scheme. After the reshuffling has completed, the updated Cuckoo hash tables have been formed.

Theorem 6 (Recursive concurrent O-RAM). Assume that the block size B>2(log N). With $$1 - \frac{1}{poly(N)}$$

probability, the concurrent recursive construction described above has O((log N)$^2$) worst-case and amortized cost, and requires O($\sqrt{N}$) client-side storage, and O(N) server-side storage.

8. Optimizations and Extensions.

8.1. Compressing the Position Map.

The position map is highly compressible under realistic workloads due to the natural sequentiality of data accesses. Overall, we can compress the position map to about 0.255 bytes per block. Hence its compressed size is 0.225 N bytes. Even for an extremely large, 1024 TB O-RAM with N=232 blocks, the position map will be under 1 GB in size. We now explain how to compress the position map.

Compressing partition numbers. Oprea et al. (A. Oprea and M. K. Reiter. *Integrity checking in cryptographic file systems with constant trusted storage*. In *USENIX Security*, 2007) showed that real-world file systems induce almost entirely sequential access patterns. They used this observation to compress a data structure that stores a counter of how many times each block has been accessed. Their experimental results on real-world traces show that the compressed data structure stores about 0.13 bytes per block. Every time a block is accessed, their data structure stores a unique value (specifically, a counter) for that block. In our construction, instead of placing newly read blocks in a random cache slot, we can place them in a pseudo-random cache slot determined by the block id and counter. Specifically, when block i is accessed for the j'th time (i.e., it's counter is j), it is placed in cache slot PRF(i, j). PRF(•) is a pseudo-random function that outputs a cache slot (or partition) number.

Compressing level numbers. Recall that each partition contains L levels such that level l contains at most $2^l$ real blocks. We can represent the level number of each block by using only 1 bit per block on average, regardless of the number of levels. This can be easily shown by computing the entropy of the level number as follows. If all levels are filled, each block has probability $2^{l-L}$ of being in level l. Then the entropy of the level number is given by:

$$-\sum_{l=0}^{L-1} 2^{l-L}\log_2(2^{l-L}) = \sum_{i=1}^{L} i \cdot 2^{-i} < 1$$

If not all levels in a partition are filled, then the entropy is even less, but for the sake of simplicity let's still use 1 bit to represent a level number within that partition. Note that since the top level is slightly larger (it contains ε extra blocks), the entropy might be slightly larger than 1 bit, but only by a negligible amount.

Using the compressed position map.

These two compression tricks allow us to compress our position map immensely. On average, we can use 0.13 bytes for the partition number and 0.125 bytes (1 bit) for the level number, for a total of 0.255 bytes per block.

Once we have located a block's partition p and level retrieving it is easy. When each level is constructed, each real block can be assigned a fresh alias PRF(K[p,l],"real-alias",u) where u is the ID of the block and PRF is a pseudo-random function. Each dummy block can be assigned the alias PRF (K[p,l],"dummy-alias",i) where i is the index of the dummy block in partition p, level l. Then during retrieval, the client fetches blocks from the server by their alias.

8.2. Reducing Server Storage.

Each partition's capacity is $\sqrt{N}+E$ blocks, where the surplus E is due to the fact that some partitions may have more blocks than others when the blocks are assigned in a random fashion to the partitions. A partition has levels l=0, ..., $\log_2 \sqrt{N}$. Each level contains $2 \cdot 2^l$ blocks (real and dummy blocks), except for the top level that contains 2ε additional blocks. Then, the maximum size of a partition on the server is $4\sqrt{N}+2\epsilon$. Therefore, the maximum server storage is $4N+29\epsilon\sqrt{N}$.

However, the maximum amount of server storage required is less than that, due to several reasons:

1. Levels of partitions are sometimes not filled. It is extremely unlikely that at some point in time, all levels of all partitions are simultaneously filled.

2. As soon as a block is read from a level, it can be deleted by the server because its value is no longer needed.

In our simulation experiments, we calculated that the server never needs to store more than 3.2N blocks at any point in time. Hence, in practice, the server storage can be regarded as being less than 3.2N blocks.

8.3. Compressing Levels During Uploading.

In Line 18 of the WritePartition routine shown in FIG. 7, the client needs to write back up to $2\sqrt{N}+o(\sqrt{N})$ blocks to the server, at least half of which are dummy blocks. Since the values of the dummy blocks are irrelevant (since the server cannot differentiate between real and dummy blocks), it is possible to use a matrix compression algorithm to save a 2× factor in terms of bandwidth.

Suppose that the client wishes to transfer 2k blocks b:=($b_1$, $b_2$, ..., $b_{2k}$). Let S ⊆ {1, 2, ..., 2k} denote the offsets of the real blocks, let $b_S$ denote the vector of real blocks. We consider the case when exactly k of the blocks are real, such as $b_S$ is of length k (if less than k blocks are real, simply select some dummy blocks to fill in). To achieve the 2× compression, the server and client share a matrix ($M_{2k \times k}$) that has the property that every square submatrix is full rank ("full rank" is also called "nonsingular") of a size which is 2k×k. Now to transfer the blocks b, the client solves the linear equation:

$$M_S \cdot x = b_S$$

where $M_S$ denotes the matrix formed by rows of M indexed by the set S, and $b_S$ denotes the vector B indexed by the set S, i.e., the list of real blocks.

The client can simply transfer x (length k) to the server in place of b (length 2k). The server decompresses it by computing y←Mx, and it is not hard to see that $y_S=b_S$. The server is unable to distinguish which blocks are real and which ones are dummy, since the matrix ensures that any subset of k values of y are a predetermined linear combination of the remaining k values of y.

8.4 XORing Data Blocks by the Server

During the ReadPartition operation, the client downloads O(log N) data blocks (one from each filled level). If at most one of those blocks is real (the one the client wanted to read) and the rest are dummy blocks and were only read to conceal which level the client wanted to read from. Then instead of the server transmitting all of the blocks the client requested, the server can instead XOR them and send them to the client. As long as the value of each dummy block is deterministic and can be recomputed by the client in the future, during a ReadPartition operation the client can compute the values of all of the dummy blocks and XOR them with the XOR'd result sent by the server to obtain the value of the real block. This saves bandwidth during the ReadPartition operation. It is important to note that this XOR technique is not compatible with the upload level compression technique.

9. "ObliviStore" O-RAM Introduction.

The following section describes embodiments a distributed O-RAM-based cloud data store which performs I/O operations asynchronously and is referred to in the text as ObliviStore. Asynchrony introduces security challenges, such as prevent information leakage not only through access patterns, but also through timing of I/O events. Various optimizations are advanced for overcoming this issue and achieving high performance, as well as techniques for a data center to dynamically scale up a distributed O-RAM. One embodiment of this distributed O-RAM achieves a throughput of 31.5 MB/s using a block size of 4K.

The following discusses aspects of making O-RAM operations asynchronous and parallel. By way of example and not limitation the embodiment describes the use of solid state storage (SSS), which can comprise solid state disk (SSD), solid state memory (SSM) and solid state cards (SSC). SSS O-RAM was selected for this embodiment as it is one of the most bandwidth efficient O-RAM constructions known to date. Due to the stringent security requirements of O-RAM, information leakage must be prevented in regard to the timing of I/O events. To address this issue, the present invention utilizes what we refer to as oblivious scheduling. This O-RAM scheduler relies on semaphores for scheduling. To satisfy the oblivious scheduling requirement, operations on semaphores (e.g., incrementing, decrementing) must depend only on information observable by an adversary who is not aware of the data request sequence.

10. Forms of Distributed O-RAM.

Typical cloud service providers have a distributed storage backend.

This section details a couple example embodiments adapting our O-RAM construction into this distributed setting. Note that naive methods of partitioning and distributing an O-RAM may violate security. For example, even if each block is assigned to a random partition when written, accessing the same block twice in a row (read after write) can leak sensitive information. Our distributed O-RAM construction applies the a partitioning framework twice to achieve secure partitioning of an O-RAM across multiple servers.

An embodiment is also described for securely scaling up a distributed O-RAM at run-time. Our techniques allow additions of new processors and storage to an existing distributed O-RAM without causing service interruption. It should be appreciated that naive techniques for supporting dynamic node joins can easily break security. Non-trivial techniques are therefore required to securely handle dynamic node joins.

10.1 Practical Optimizations.

The embodiments described herein take into account additional practical considerations. For example, we use batch shuffling to boost the parallelism of the construction. We reorder and coalesce asynchronous I/O requests to storage to optimize the number of seeks on rotational drives. We achieve parallelism through asynchronous operations with callbacks, rather than using more threads, to reduce thread scheduling contention. Read accesses are given higher scheduling priority to minimize blocking on shuffling I/O's, and hence result in a lower overall response time, yet we make sure that the shuffling always keeps up with the accesses.

The inventive load balancer described only needs about 4 bytes of metadata per data block. While the metadata size is linear, in theory, its practical size is typically comparable to or smaller than storing $O(\sqrt{N})$ data blocks. For theoretic interest, with suitable modifications to the scheme, it is possible to achieve sublinear client storage by recursively outsourcing the metadata to the untrusted storage as well. In practice, however, the recursion depth is preferably 1 to 3.

11. Architecture and Trust Model.

Abstractly, all O-RAM methods assume a trusted client, and an untrusted storage provider. In the distributed O-RAM embodiments, the trusted client consists of an oblivious load balancer and multiple O-RAM nodes. In practice, this typically means we need to trust the part of the software implementing the oblivious load balancer and O-RAM nodes. However, the rest of the system need not be trusted—specifically, we do not trust the network, the storage arrays, or the remainder of the software stack (other than the part that implements the oblivious load balancer and O-RAM node algorithms).

Figure 14:
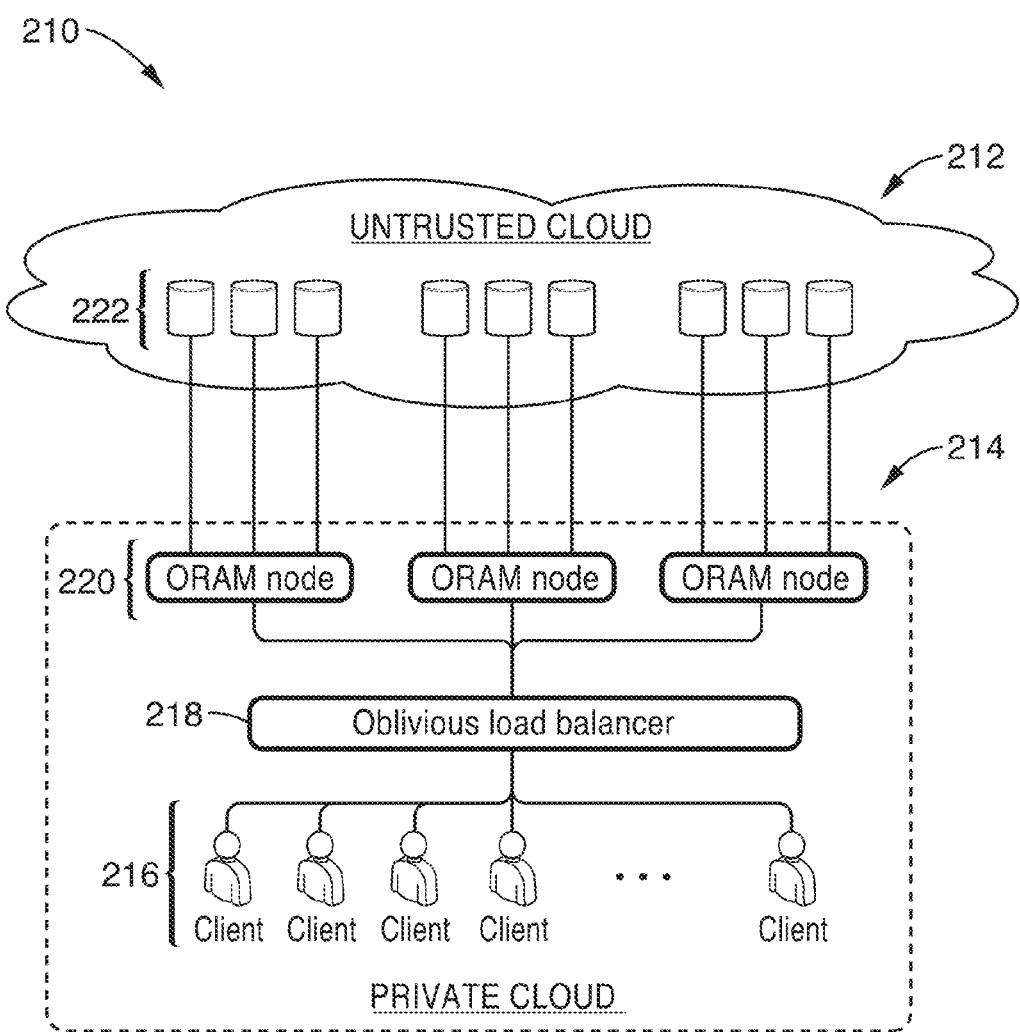
FIG. 14 is a block diagram of a private cloud-public cloud deployment utilizing the O-RAM according to an embodiment of the present invention.
Figure 15:
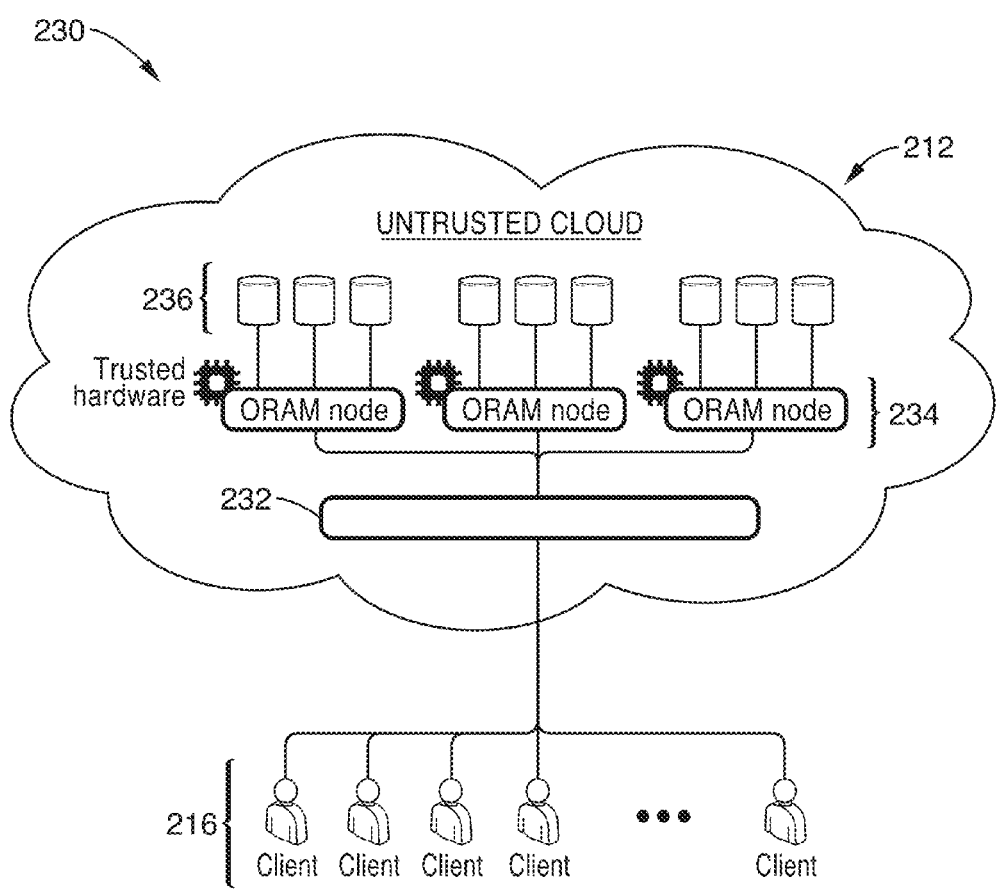
FIG. 15 is a block diagram of trusted hardware, utilizing the O-RAM according to an embodiment of the present invention, in an untrusted cloud.

FIG. 14 and FIG. 15 illustrate two general O-RAM deployment embodiments. In FIG. 14 a hybrid cloud embodiment 210 of O-RAM deployment is shown. In FIG. 15 there is some trusted hardware in the cloud. This approach appears one promising topology for building future privacy-preserving cloud services. It should be appreciated that FIGS. 14 and 15 are provided by way of example for deploying the inventive O-RAM methods and apparatus, although the inventive elements can be integrated within a wide range of known and proposed topologies, and combinations thereof, without departing from the teachings of the present invention.

11.1 Hybrid Cloud.

Referring again to embodiment 210 of FIG. 14 there is an untrusted cloud 212 which is being utilized by a private cloud 214. Within the private cloud are a plurality of clients 216, each client comprising a computer system with secure storage needs. These clients 216 are connected into an oblivious load balancer 218 which directs operations of multiple groups of O-RAMs through O-RAM nodes 220. Each O-RAM node 220 is connected to multiple data stores 222 within untrusted cloud 212. In a simplified case, each node has one instance of an O-RAM, yet it can be built according to the invention with have more than one if desired. More importantly, each node is connected to multiple storage locations so that the node may store the O-RAM data distributed across multiple logical and/or physical storage locations.

The above configuration can be utilized in a number of applications, the following being just one by way of illustration. One deployment scenario is corporate storage outsourcing. Suppose an organization, such as a company or government agency, desires to outsource or backup its databases or file systems to untrusted cloud storage providers. Toward increasing security, they may want to separate the trusted components from the untrusted components, with more control over the trusted elements, such as by hosting the trusted components in a private cloud in house, while outsourcing the untrusted storage to remote cloud providers. This approach has been advanced in the literature, and when implemented using the inventive O-RAM methods can achieve practicality. As can be seen in the figure oblivious load balancer 218 and the O-RAM nodes 220 reside in house with the clients 216, while the storage is provided by storage providers 222 within the untrusted cloud 212.

11.2 Trusted Hardware in the Cloud.

Referring now to embodiment 230 of FIG. 15 there is an untrusted cloud 212 which is being utilized by multiple clients 216. Within the private cloud are a plurality of clients 216, each client comprising a computer system with secure storage needs. Security is provided within this untrusted cloud by using O-RAM in combination with trusted hardware, to ensure access privacy. The trusted hardware may take the form of Trusted Platform Modules (TPMs) or secure co-processors to establish a Trusted Computing Base (TCB) at the cloud service provider, as described in the literature. The present invention has a number of elements which interoperate with these TPMs and TCBs to facilitate practical security. In the figure, a little IC symbol is used to indicate the use of trusted hardware in the oblivious load balancer 232 and O-RAM modes 234, while the storage providers 236 do not require this trusted hardware.

More particularly, in the above topology the inventive O-RAM load balancer and O-RAM node processes are implemented as part of the distributed TCB, and are in charge of encryption and privatizing access patterns. Other than the TCB, the remainder of the software stack on the cloud is untrusted.

It is contemplated that the above deployment strategy can provide numerous benefits for building a next generation of privacy-preserving cloud services. The topology of trusted elements within an untrusted cloud is made use of by various online services, such as behavioral advertising and web search, because it is understood that access patterns can reveal a great deal of sensitive information. For example, retrieving information about a certain drug can reveal a user's medical condition; and retrieving information about a restaurant in New York can reveal the user's current location.

Several prior works have outlined a vision of using trusted hardware to establish a "trust anchor" in the cloud, which in turn relies on some form of Oblivious RAM to retrieve data from untrusted storage while providing access privacy.

Incorporated in such a scenario, the inventive O-RAM load balancer and O-RAM node processes are implemented within the distributed TCB, and control encryption and privatizing access patterns. Other than the TCB, the remainder of the software stack on the cloud is untrusted. Existing work has also discussed minimizing the TCB to reduce attack surface, and in some cases make it amenable to formal verification. The elements of the present invention provide benefits toward achieving these goals as well.

Using TPMs and Trusted Computing, we expect distributed O-RAM performance to provide similar efficiency and reduced overhead as described in previous sections of the invention, since trusted execution imposes relatively small computational overhead. Moreover, it has been determined in regard to this invention that computation is not the bottleneck for ObliviStore when implemented on modern processors. On the other hand, off-the-shelf secure co-processors (e.g., IBM 4768) may offer the additional benefit of physical security; however, they are constrained (e.g., in terms of chip I/O, computational power, and memory) and would thus pose a bottleneck for an O-RAM implementation, as demonstrated in the literature. However, it expected that high performance secure co-processors suitable for O-RAM can be built which are designed to utilize and/or interoperate with the methods and process elements detailed herein.

Before proceeding into the next section, it should be appreciated that these embodiment are built upon the partitioning framework described in previous sections.

FIG. 16 illustrates a summary embodiment 240 of the partitioning framework in which the O-RAM is divided into a plurality of partitions as a function of capacity. The example figure briefly describes read operations utilizing the partitions, and use of evict.

12. Asynchronous O-RAM Defined.

An asynchronous O-RAM consists of a client, a server, and a network intermediary. Let seq denote a data access sequence:

$$\text{seq} := [(\text{blockid}_1, t_1), (\text{blockid}_2, t_2), \ldots, (\text{blockid}_m, t_m)]$$

where each $\text{blockid}_i$ denotes a logical block identifier, and each $t_i$ denotes the time of arrival for this request. Given any data access sequence seq, the O-RAM client interacts with the server to fetch these blocks. Let us denote the event sequence resulting from a data access as follows.

$$\text{events} := [(\text{addr}_1, \tau_1), (\text{addr}_2, \tau_2), \ldots, (\text{addr}_c, \tau_c)] \quad (1)$$

where each $\text{addr}_i$ denotes a requested physical address on the server storage, and $\tau_i$ denotes the time at which the request is sent from the client.

It is assumed that the network and the storage are both under the control of an adversary, who can introduce arbitrary delays of its choice in packet transmissions and responses to requests.

12.1 Distributed Asynchronous O-RAM.

A distributed asynchronous O-RAM consists of multiple distributed trusted components which can communicate with each other, and communicate with untrusted storage servers. The adversary is considered to be in control of the storage servers, as well as all network communication. Although in practice, the storage servers are typically also distributed, for the security definitions below, we consider all untrusted storage servers as a unity—since they are all controlled by the adversary. In this section, we consider the abstract model of distributed asynchronous O-RAM, while possible real-world instantiations are described in a later section.

For a distributed asynchronous O-RAM, we can define the sequence of all events to be composed of: (1) all I/O requests (and their timings) between a trusted component to the untrusted storage; and (2) all (encrypted) messages (and their timings) between two trusted components as follows:

$$\text{events} := \begin{bmatrix} (\text{addr}_1, \tau_1, \kappa_1), & (\text{addr}_2, \tau_2, \kappa_2), & \ldots, & (\text{addr}_c, \tau_c, \kappa_c), \\ (m_1, \tilde{\tau}_1, \kappa_1, \kappa'_1), & (m_2, \tilde{\tau}_2, \kappa_2, \kappa'_2), & \ldots, & (m_d, \tilde{\tau}_d, \kappa_d, \kappa'_d) \end{bmatrix} \quad (2)$$

in which $(\text{addr}_i, \tau_i, \kappa_i)$ denotes that trusted component $\kappa_i$ requests physical address $\text{addr}_i$ from untrusted storage at time $\tau_i$ and $(m_i, \tilde{\tau}_i, \kappa_i, \Lambda'_i)$ denotes that trusted component $\kappa_i$ sends an encrypted message m to trusted component $k'_i$ at time $\tilde{\tau}_i$.

In a similar manner to the non-distributed case, we say that a distributed asynchronous O-RAM is secure, if an adversary (in control of the network and the storage) cannot distinguish any two access sequences of the same length and timing from the sequence of observable events.

12. 2 Definition 6 (Oblivious Accesses and Scheduling).

Let $\text{seq}_0$ and $\text{seq}_1$ denote two data access sequences of the same length and with the same timing:

$$\text{seq}_0 := [(\text{blockid}_1, t_1), (\text{blockid}_2, t_2), \ldots, (\text{blockid}_m, t_m)]$$

$$\text{seq}_1 := [(\text{blockid}'_1, t_1), (\text{blockid}'_2, t_2), \ldots, (\text{blockid}'_m, t_m)]$$

By example we consider the following game with an adversary who is in control of the network and the storage server: (i) The client flips a random coin b. (ii) Now the client runs distributed asynchronous O-RAM algorithm and plays access sequence $\text{seq}_b$ with the adversary. (iii) The adversary observes the resulting event sequence and outputs a guess b' for b.

We say that a (distributed) asynchronous O-RAM is secure, if for any polynomial-time adversary, for any two sequences $\text{seq}_0$ and $\text{seq}_1$ of the same length and timing, $$\left| \Pr[b' = b] - \frac{1}{2} \right| \le \text{negl}(\lambda);$$

in which $\lambda$ is a security parameter, and negl is a negligible function. Note that the set of events observed by the adversary in the non-distributed and distributed case are given in Equations 1 and 2 respectively.

13. Asynchronous O-RAM Construction.

This section describes configuring O-RAM to be asynchronous, and focuses on the non-distributed case, while the distributed case is described in the next section.

13.1 Overview of Components and Interfaces.

Figure 17:
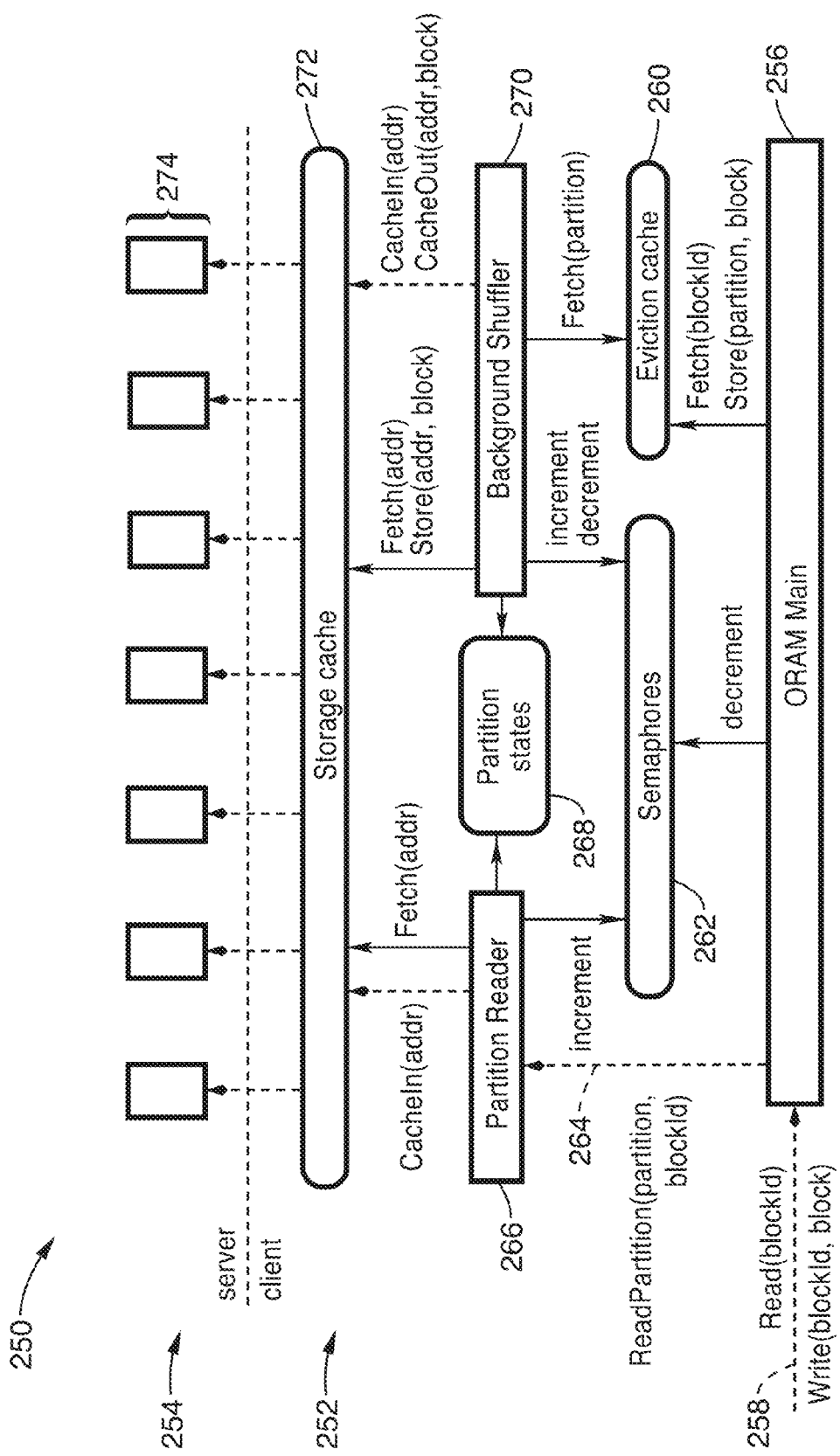
FIG. 17 is a block diagram of an asynchronous O-RAM method according to an embodiment of the present invention.

FIG. 17 illustrates an example embodiment 250 of asynchronous O-RAM according to the invention on client side 252 connected to data storage 274 on a server side 254. It should be appreciated that although this O-RAM embodiment is illustrated here using a number of functional blocks, it is preferably implemented with programming executing with the client computer, or another computer on behalf of the client.

Three major functional components are shown in the figure, with O-RAM main process 256, partition reader 266, and the background shuffler 270. O-RAM main 256 is the entry point and takes in asynchronous calls 258 of the form Read (blockId) and Write(blockId,block). Responses to these calls are passed through callback functions.

In addition, there is a storage cache 272 which temporarily stores blocks read in from server 254 partitions 274 for shuffling, including early cache-ins and shuffling cache-ins. This storage cache 272 also temporarily stores blocks after shuffling intended to be written back to the server. Upon a CacheIn (addr) request, the storage cache reads from the server a block from address addr, and temporarily stores this block till it is cached out by CacheOut(addr,block). Upon this CacheOut (addr,block) request, the storage cache writes back to the server a block at address addr, and erases the block from the cache. Blocks are re-encrypted before being written back to the storage server, such that the server cannot link blocks based on their contents. The client also attaches appropriate authentication information to each block so it can later verify its integrity, and prevent malicious tampering by the untrusted storage. Additionally, the storage cache also supports two synchronous operations, i.e., Fetch(addr) and Store(addr, block), allowing the caller to synchronously fetch a block that already exists in the cache, or to synchronously store a block to the local cache. There are 4 types of cache-ins.

A partition states block 268 retains (stores) the state of each partition, including which levels are filled, information related to shuffling, and cryptographic keys. A semaphores block 262 is used to synchronize the operations of the other blocks. There is also a shuffling buffer (not shown) used for locally permuting data blocks for shuffling.

O-RAM main handler looks up the position map to determine which partition the requested block resides in, and generates a call 264 to partition reader 266 which operates through storage client side cache 272 to asynchronously obtain the block from the partition in server side data storage 274. The block is placed in a freshly chosen random eviction cache 260. If the request is a write request, the block on the server partition is overwritten with the new data before being placed in the eviction cache. The O-RAM main handler then updates the position map accordingly.

The partition reader 266 is chiefly responsible for reading a requested block from a chosen partition using CacheIn (addr), and Fetch(addr) calls. It takes in asynchronous calls of the form ReadPartition(partition,blockId), where responses are passed through callback functions. Partition reader is seen to also be configured to increment the semaphores.

The background shuffler 270 manages scheduling and performing the shuffling jobs. The shuffler uses Fetch(addr), Store(addr,block), CacheIn(addr), and CacheOut(addr, block) calls that operate through storage cache 272 on server side data storage partitions 274. In addition, background shuffler 270 can increment/decrement semaphore, and perform a Fetch(partition) from eviction cache 260.

The eviction cache 260 operates to temporarily cache real reads before eviction. It receives calls from O-RAM main 256 for Fetch(blockId), and Store(partition,block). The eviction cache is also operated on by the background shuffler as indicated above.

13.2 Data Structures and Data Flow

Informally, when a block is read from the server, it is first cached by the storage cache. Then, this block is either directly fetched into the shuffling buffer to be reshuffled; or it is passed along through the partition reader to the O-RAM main handler, as the response to a data access request. The O-RAM main handler then adds the block to an eviction cache, where the block will reside for a while before being fetched into the shuffling buffer to be reshuffled. Reshuffled blocks are then written back to the server asynchronously (unless they are requested again before being written back).

13.3 O-RAM Partitions.

Each partition is a smaller O-RAM instance by itself. The system employs a partition O-RAM based any desired hierarchical construction, such as that initially proposed by Goldreich and Ostrovsky (O. Goldreich and R. Ostrovsky. *Software protection and simulation on oblivious RAMs. J. ACM*, 1996.), and specially geared towards optimal practical performance. Each partition consists of $$\frac{1}{2}\log N + 1$$

levels, where level i can store up to $2^i$ real blocks, and $2^i$ or more dummy blocks.

For each O-RAM partition, the client maintains a set of partition states as described below.

13.3.1 Partition States.

Each partition has the following states:

(a) A counter $C_p$ having a value of $C_p \in [0, \text{partition\_capacity}]$ which signifies the state of partition p. Specifically, let $C_p := \Sigma_i b_i \cdot 2^i$ denote the binary representation of the counter $C_p$ corresponding to partition p. This means that the state of the partition p should be: (1) for every nonzero bit $b_i$, level i of the partition is filled on the server; and (2) for every bit $b_i = 0$, level i is empty.

(b) Job size $J_p$ represents how many blocks (real or dummy) are scheduled to be written to this partition in the next shuffle. $J_p$ is incremented every time a partition p is scheduled for an eviction. Notice that the actual eviction and the associated shuffling work may not take place immediately after being scheduled.

(c) bit bShuffle indicates whether this partition is currently being shuffled.

(d) Dummy counters. Each partition also stores a dummy block counter for each level, allowing a client to read the next previously unread dummy block (at a pseudorandom address).

(e) Read/unread flags. For every non-empty level, we store which blocks remain to be read for shuffling.

13.3.2 Batch Shuffling.

In this particular O-RAM embodiment a new shuffling job is created whenever a block is being written to a partition. Programming performs these shuffling jobs sequentially, one after another. It should be appreciated, however, that a new shuffling job can be created while the corresponding partition is still being shuffled. Therefore, the programming relies on a shuffling job queue to keep track of the list of pending shuffling jobs.

As a practical optimization, we describe a method to batch multiple shuffling jobs together. When a shuffling job is being started for a partition p, let $C_p$ denote the current partition counter. Recall that the binary representation of $C_p$ determines which levels are filled for partition p. Let $J_p$ denote the current job size for partition p. This means that upon completion of this shuffling, the partition counter will be set to $C_p + J_p$. Furthermore, the binary representation of $C_p + J_p$ determines which levels are filled after the shuffling is completed. The values of $C_p$ and $J_p$ at the start of the shuffling job jointly determine which levels need to be read and shuffled, and which levels to be written to after the shuffling.

New blocks can get scheduled to be evicted to partition p before its current shuffling is completed. The present embodiment (ObliviStore) does not try to cancel the current shuffling of partition p to accommodate the newly scheduled eviction.

Instead, it continues to finish the current shuffling, and effectively queue the newly scheduled evictions for later shuffling. To do this the programming (i) at the start of each shuffling takes a snapshot of the job size: $\hat{J}_p \leftarrow J_p$; and (ii) sets $J_p \leftarrow 0$. In this way, $J_p$ can still be used to keep track of how many new blocks are scheduled to be evicted to partition p, even before the current shuffling is completed.

13.4 Satisfying Scheduling Constraints with Semaphores.

Programming within the asynchronous O-RAM construction decides how to schedule various operations, including when to serve data access requests, how to schedule shufflings of partitions, and when to start shuffling jobs.

13.4.1 Constraints.

We wish to satisfy the following constraints when scheduling various operations of the O-RAM programming.

(a) Client storage constraint. The client's local storage should not exceed the maximum available amount. Particularly, there should not be too many early reads, shuffling reads, or real reads.

(b) Latency constraint. Data requests should be serviced within bounded time. If too many shuffling jobs are in progress, there may not be enough client local storage to serve a data access request, causing it to be delayed.

13.4.2 Semaphores.

To satisfy the aforementioned scheduling constraints, different components rely on semaphores to coordinate with each other. In our O-RAM implementation, we use four different types of semaphores, where each type indicates the availability of a certain type of resource.

(1) early cache-ins semaphore, indicating how many remaining early cache-ins are allowed, (2) shuffling buffer semaphore, indicating how many more blocks the shuffling buffer can store, (3) eviction semaphore, indicating how much data access is allowed to stay ahead of shuffling. This semaphore is decremented to reserve "evictions" as a resource before serving a data access request; and is incremented upon the eviction of a block (real or dummy) from the eviction cache.

(4) shuffling I/O semaphore, indicating how much more I/O work the background shuffler is allowed to perform. This semaphore defines how much the shuffler is allowed to stay ahead of the normal data accesses, and prevents too much shuffling work from starving the data accesses.

Among the above semaphores, the early cache-in, shuffling buffer, and eviction semaphores are meant to bound the amount of client-side storage, thereby satisfying the client storage constraint. For early cache-ins and shuffling cache-ins, we bound them by directly setting a limit on the cache size, i.e., how many of them are allowed to be concurrently in the cache. The eviction semaphore mandates how much data accesses are allowed to stay ahead of shuffling—this in some sense is bounding the number of real blocks in the eviction cache. As explained later, due to security reasons, we cannot directly set an upper bound on the eviction cache size as in the early cache-in and shuffling buffer semaphores. Instead, we bound the number of real blocks indirectly by pacing the data accesses to not stay too much ahead of shuffling work. Finally, the shuffling I/O semaphore constrains how much shuffling I/O work can be performed before serving the next data access request. This is intended to bound the latency of data requests.

13.4.3 Preventing Information Leakage Through Semaphores.

One challenge is preventing information leakage through semaphores. If not careful, the use of semaphores can potentially leak information. For example, when reading blocks from the server, some blocks read are dummy, and should not take space on the client-side to store. In this sense, it may seem that we need to decrement a semaphore only when a real block is read from the server. However, doing this can potentially leak information, since the value of the semaphore influences the sequence of events, which the server can observe.

13.4.4 Invariant 1 (Enforcing Oblivious Scheduling).

To satisfy the oblivious scheduling requirement, we require that the values of semaphores must be independent of the data access sequence. To achieve this, operations on semaphores, including incrementing and decrementing, must depend only on information observable by an outside adversary who does not now the data request sequence.

For example, this explains why the eviction semaphore does not directly bound the eviction cache size as the early cache-in and shuffling buffer semaphores do—since otherwise the storage server can potentially infer the current load of the eviction cache, thereby leaking sensitive information.

To address this issue, we design the eviction semaphore not to directly bound the amount of eviction cache space available, but to pace data accesses not to stay too much ahead of shuffling. If we pace the data accesses and shuffling appropriately, the eviction cache load is bounded by $O\sqrt{N}$ with high probability.

13.5 Detailed Process Descriptions.

Examples of the O-RAM main 260, partition reader 265, read real 270, fake read 275 and background shuffler 280 programming are detailed in FIG. 18, FIG. 19, FIG. 20, FIG. 21 and FIG. 22A and FIG. 22B, respectively with semaphores highlighted in bold.

Notice that all semaphore operations rely only on publicly available information, but not on the data request sequence—either directly or indirectly. This is crucial for satisfying the oblivious scheduling requirement, and will also be crucial for the security proof in the full version.

FIG. 23 illustrates a read operation example embodiment 290, as previously described in relation to FIG. 6 with a client 294 reading from a partition 296 on a server 292. One sees that one block (296a through 296f) is read (298a through 298f) from each level, with one of them being the real block 300.

The background shuffling loop described in FIG. 22 specifies how the client performs a shuffling job. In this embodiment of the system, shuffling is implemented in the form of a pipeline. Each job consists of the following 5 stages: (1) starting all of the reads, (2) waiting for all of the reads to complete, (3) shuffling the read data locally, (4) starting all of the writes of the shuffled data, and (5) waiting for all of the writes to complete. Multiple jobs are performed in parallel such that the first stage of a job must complete before starting the first stage of the next job. The number of jobs in the pipeline is such that jobs get started as long as the sum of the amount of blocks they will read don't exceed the amount allowed by the shuffling buffer semaphore.

Figure 24:
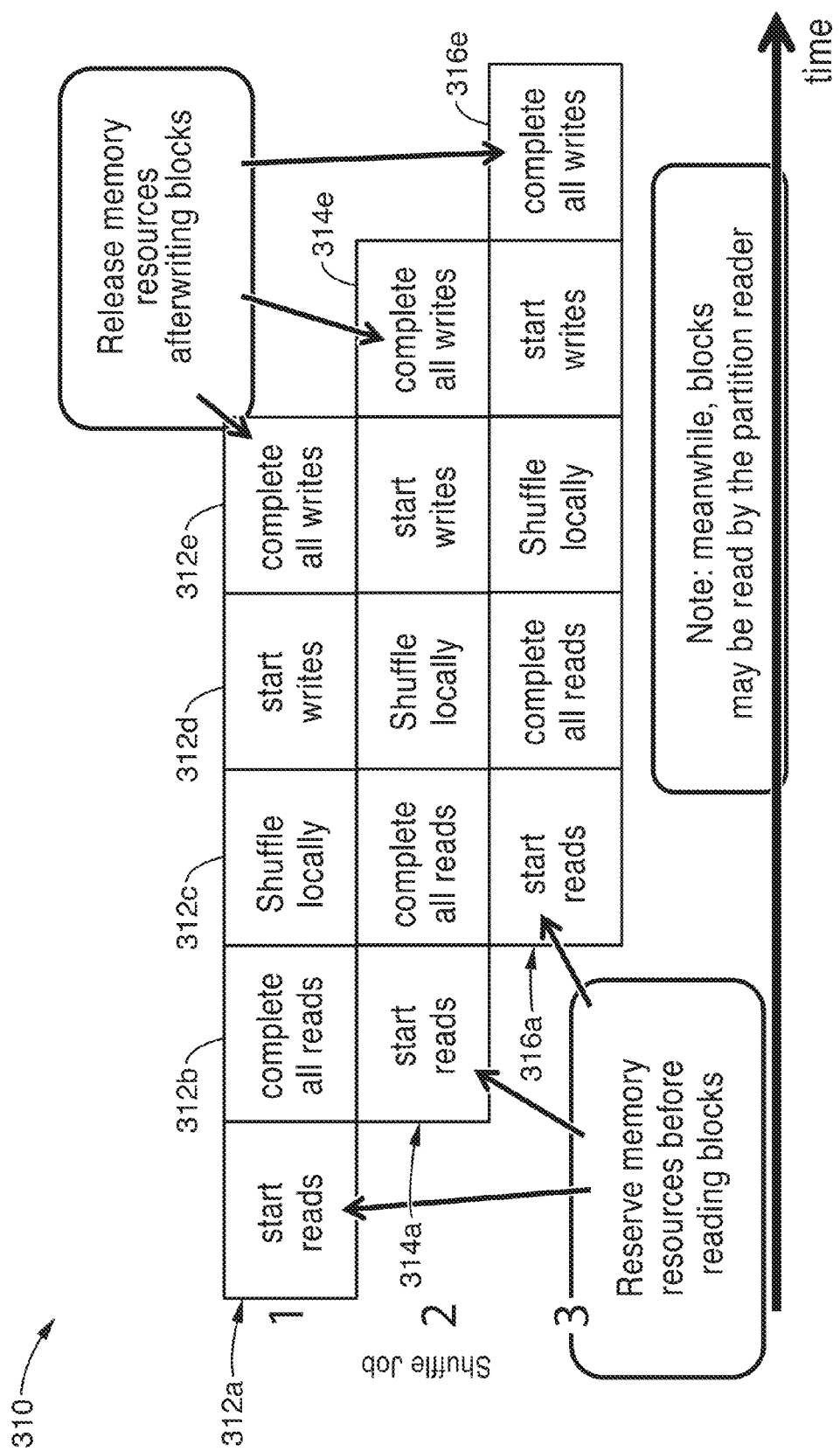
FIG. 24 is a data diagram of asynchronous shuffling pipeline according to an embodiment of the present invention.

FIG. 24 illustrates an example of the above asynchronous shuffling pipeline. Without pipelining shuffle jobs are latency limited: O(k log N) round-trips for k ORAM operations. For example with 50 ms latency, 1 TB O-RAM, 4 KB blocks, if we want to write 1 MB file (k=256 O-RAM operations), then the total time required is about 50 ms*256*30=384 seconds. Thus, without pipelining it would take over 6 minutes to write a 1 MB file.

Pipelining I/O operations of each job still does not provide sufficient speed, as it leads to a reduction in round-trips from O(k log N) to k. Accordingly, it would still require about 15 seconds for 1 MB file even if bandwidth is plentiful, with practical performance could be worse as distribution of job sizes can be highly skewed.

The present invention thus preferably pipelines IOs across multiple shuffle jobs as seen in the example embodiment 310 of FIG. 24. Each shuffle job 312*a* through 312*e*, 314*a* through 314*e*, and 316*a* through 316*e* is seen following the same steps. For the uppermost job we see the steps of start read 312*a*, complete all reads 312*b*, shuffle locally 312*c*, start writes 312*d*, complete all writes 312*e*, after which memory is released. The figure shows the use of pipelining with the staggered access by each of the shuffling jobs. This form of pipelining leads to significant latency improvement.

14. Distributed O-RAM.

One naive way to distribute an O-RAM is to have a single trusted compute node with multiple storage partitions. However, in this case, the computation and bandwidth available at the trusted node can become a bottleneck as the O-RAM scales up. We have developed a distributed O-RAM that distributes not only distributes storage, but also computation and bandwidth.

Our distributed O-RAM consists of an oblivious load balancer and multiple O-RAM nodes. The key idea is to apply the partitioning framework twice. The partitioning framework was initially developed to reduce the worst-case shuffling cost in O-RAMs, but we observe that we can leverage it to securely perform load balancing in a distributed O-RAM. Specifically, each O-RAM node is a "partition" to the oblivious load balancer, which relies on the partitioning framework to achieve load balancing amongst multiple O-RAM nodes. Each O-RAM node has several storage partitions, and relies on the partitioning framework again to store data blocks in a random storage partition with every data access. One benefit of the distributed architecture is that multiple O-RAM nodes can perform shuffling in parallel.

14.1. Detailed Distributed O-RAM Construction.

To access a block, the oblivious load balancer first looks up its position map, and determines which O-RAM node is responsible for this block. The load balancer than passes the request to this corresponding O-RAM node. Each O-RAM node implements a smaller O-RAM consisting of multiple storage partitions. Upon obtaining the requested block, the O-RAM node passes the result back to the oblivious load balancer. The oblivious load balancer now temporarily places the block in its eviction caches. With every data access, the oblivious load balancer chooses v random O-RAM nodes and evicts one block (possibly real or dummy) to each of them, through an O-RAM write operation.

Each O-RAM node also implements the shuffling functionalities previously described. In particular, the O-RAM nodes can be regarded as parallel processors capable of performing reshuffling in parallel. The oblivious load balancer need not implement any shuffling functionalities, since it does not directly manage storage partitions. Hence, even though the load balancer is a central point, its functionality is very light-weight in comparison with O-RAM nodes which are in charge of performing actual cryptographic and shuffling work.

Notice that each O-RAM node may not be assigned an equal amount of storage capacity. In this case, the probability of accessing or evicting to an O-RAM node is proportional to the amount of its storage capacity. For ease of explanation, we assume that each storage partition is of equal size, and that each O-RAM node may have a different number of partitions—although in reality, the system can also support partitions of uneven sizes in a similar fashion.

Our distributed asynchronous O-RAM construction satisfies the security notion described in Definition 1. Both the oblivious load balancer and the O-RAM node algorithms are perfectly simulatable by the adversary, without having to observe the physical addresses accessed.

14.2 Dynamic Scaling Up.

14.2.1 Adding Compute Nodes.

When a new O-RAM node processor is being added to the system (without additional storage), the new O-RAM node processor registers itself with the load balancer. The load balancer now requests existing O-RAM nodes to provide (hand over) some of their existing partitions to be handled by the new processor. To do this, the O-RAM nodes also need to provide (hand over) part of their local metadata to the new processor, including part of the position maps, eviction caches, and partition states. The load balancer also needs to update its local metadata accordingly to reflect the fact that the new processor is now handling the reassigned partitions.

14.2 2. Adding Compute Nodes and Storage.

The more difficult case is when both new processor and storage are being added to the system. One naive idea is for the O-RAM system to immediately start using the new storage as one or more additional partitions, and allow evictions to go to the new partitions with some probability. However, doing so would result in information leakage. Particularly, when the client is reading the new partition for data, it is likely reading a block that has been recently accessed and evicted to this partition.

We have developed a new method for handling addition of new O-RAM nodes, including processor and storage. When a new O-RAM node joins, the oblivious load balancer and the new O-RAM node jointly build up new storage partitions. At any point of time, only one storage partition is being built. Building up a new storage partition involves:

(a) Random block migration phase. The load balancer selects random blocks from existing partitions, and migrates them to the new partition. The new partition being built is first cached in the load balancer's local trusted memory, and it will be sequentially written out to disk when it is ready. This requires about $O\sqrt{N/D}$ amount of local memory, where N is the total storage capacity, and D is the number of O-RAM nodes.

During the block migration phase, if a requested block resides within the new partition, the load balancer fetches the block locally, and issues a dummy read to a random existing partition (by contacting the corresponding O-RAM node). Blocks are only evicted to existing partitions until the new partition is fully ready.

(b) Marking partition as ready. At some point, enough blocks would have been migrated to the new partition. Now the load balances sequentially writes the new partition out to disk, and marks this partition as ready.

(c) Expanding the address space. The above two steps migrate existing blocks to the newly introduced partition, but do not expand the capacity of the O-RAM. We need to perform an extra step to expand O-RAM's address space.

Similarly, the challenge is how to do this securely. Suppose the old address space is [1,N], and the new address space after adding a partition is [1,N'], where N'>N. One naive idea is to randomly add each block in the delta address space [N+1,N'] to a random partition. However, if the above is not an atomic operation, and added blocks become immediately accessible, this can create an information leakage. For example, after the first block from address space [N+1,N'] has been added, at this time, if a data access request wishes to fetch the block added, it would definitely visit the partition where the block was added. To address this issue, the system first assigns each block from address space [N+1,N'] to a random partition—however, at this point, these blocks are not accessible yet. Once all blocks from address space [N+1,N'] have been assigned, the load balancer notifiers all O-RAM nodes, and at this point, these additional blocks become fully accessible.

Initially, a new O-RAM node will have 0 active partitions. Then, as new storage partitions get built, its number of active partitions gradually increases. Suppose that at some point of time, each existing O-RAM node has $c_1, c_1, \ldots c_{m-1}$ partitions respectively, and the newly joined O-RAM node has $c_m$ active partitions, while one more partitions is being built. Suppose all partitions are of equal capacity, then the probability of evicting to each active partition should be equal. In other words, the probability of evicting to the i'th O-RAM node (where $i \in [m]$) is proportional to $c_i$.

The remaining question is when to stop the migration and mark the new partition as active. This can be performed as follows. Before starting to build a new partition, the oblivious load balancer samples a random integer from the binomial distribution $$k \stackrel{\$}{\leftarrow} B(N, \rho),$$

where N is the total capacity of the O-RAM, and $$\rho = \frac{1}{P+1},$$

where P denotes the total number of active partitions across all O-RAM nodes. The goal is now to migrate k blocks to the new partition before marking it as active. However, during the block migration phase, blocks can be fetched from the new partition but not evicted back to it. These blocks fetched from the new partition during normal data accesses are discounted from the total number of blocks migrated.

15. Results.
15.1 Single Client-Server Setting.

Testing was performed of the inventive O-RAM system with rotational HDD on a single O-RAM node with an i7-930 2.8 GHz CPU and 7 rotational 1 TB 7200 RPM HDDs with 12 ms random I/O latency. To be comparable to PrivateFS, our experiments are performed over a network link simulated to have 50 ms latency (by delaying requests and responses). We also choose the same block size, i.e., 4 KB, as PrivateFS. In this setup, the throughput of the invention was found to be about 364 KB/s. Response time for a 1 TB O-RAM was found to about 196 ms under maximum load—therefore, the response time accounts for both the online data retrieval and the offline shuffling overhead.

In comparison with the other O-RAM approaches of PrivateFS and PD-O-RAM, the present invention under similar conditions provides about 18 times higher throughput than PrivateFS.

In testing latencies, the results suggest that for rotational hard drives, the throughput of the inventive system is nearly unaffected until about 1 second of network latency. To obtain higher throughput beyond 1s network latency, we can increase the level of parallelism within the implementation, i.e., allowing more concurrent I/Os—but this leads to higher response time due to increased queuing and I/O contention.

The response time of ObliviStore (single node with 7 HDDS) is consistently 140 ms to 200 ms plus the round-trip network latency. The additional 140 ms to 200 ms is due to disk seeks, request queuing, and I/O contention.

Testing performed with solid state drives. Even though our implementation makes significant progress in reducing disk seeks, there are still about 4 to 10 seeks per O-RAM operation on average. Solid state drives (SSDs) are known to perform much better with seek intensive workloads, but are also currently more expensive per GB of storage than HDDs. To compare HDD and SSD storage, we repeated the experiments with 2×1TB solid state drives on Amazon EC2. The throughput of the inventive embodiment with 2 SSDs of storage is about 6 to 8 times faster than with 7 HDD. For a typical 50 ms network link, the response time with SSD storage is about half of that with HDD storage.

In answering the question whether HDDs or SSDs! Our testing suggests that it would require between about 21 to 28 HDDs to achieve the same throughput as a single SSD.

Since the SSDs used in the experiment are about 20 times more expensive than the HDDs, for a fixed throughput, SSDs are slightly cheaper than HDDs. On the other hand, HDDs are about 20 times cheaper per unit of capacity. Under a typical 50 ms network latency, SSDs halve the response time in comparison with HDDs.

15.2 Distributed Setting.

Testing was performed on the scalability of this distributed O-RAM embodiment (ObliviStore). A deployment scenario was considered with a distributed TCB in the cloud that assumes TCB is established through techniques such as Trusted Computing, and that the TCB is running on a modern processor.

For the distributed SSD experiments, each O-RAM node was an Amazon EC instance with 2×1 TB SSDs of storage directly attached. Although our instances have 60 GB of provisioned RAM, our implementation used far less (under 3 GB per O-RAM node, and under 3.5 GB for the load balancer). The load balancer and the O-RAM nodes communicate through EC2's internal network (under 5 ms network latency).

It was found that the O-RAM embodiment scales up linearly with the number of O-RAM nodes, as long as the network does not become saturated. The total bandwidth overhead between the oblivious load balancer and all O-RAM nodes is 2×, and we never saturated the network in all our experiments. For example, with 10 O-RAM nodes and 4 KB block size, the O-RAM throughput is about 31.5 MB/s, and the total bandwidth between the load balancer and all O-RAM nodes is about 63 MB/s. It was also found that the response time of ObliviStore in the distributed setting is about 60 ms for 4 KB blocks and is mostly unaffected by the number of nodes.

The throughput of ObliviStore using HDD storage (also tested on Amazon EC2) similarly scales linearly with the number of nodes.

15.3 I/O Bottleneck Analysis.

I/O overhead. ObliviStore was found to incur about a 40×-50× I/O overhead under parameters used in our experiments, i.e., to access one data block while concealing access patterns, on average 40-50 data blocks need to be accessed. Though this seems high, under the amount of O-RAM capacity and private memory considered in this paper, the SSS scheme (what we implement) seems to achieve the lowest I/O overhead (absolute value instead of asymptotics) among all known O-RAM schemes. Therefore, this is essentially the cost necessary to achieve the strong security of O-RAM.

For the hybrid cloud setting, our experiments show that the network bandwidth between the private and public cloud is likely to be the bottleneck. For example, assuming a 1 Gbps link between the private and public cloud, the network will become a bottleneck with a single O-RAM node with 2 SSD drives—at the point of saturation, we would achieve roughly 25 Mbps (or 3 MB/s) O-RAM throughput. For the trusted hardware in the cloud scenario, assume that SSD drives are directly attached to O-RAM nodes, and that the distributed TCB is running on modern processors (e.g., using Trusted Computing to establish a distributed TCB in the cloud)1. In this case, the bottleneck is likely to be disk I/O, since the total amount of data transferred between the oblivious load balancer and the O-RAM nodes is relatively small, whereas the provisioned network bandwidth between them is large. Specifically, under our setup where each O-RAM node has 2SSDs directly attached, suppose the network bandwidth is Z bps shared amongst the oblivious load balancer and all O-RAM nodes, we can support roughly 20 Z O-RAM nodes before the network starts to be saturated.

The total O-RAM throughput should be 3:2y MB/s, where y<20Z is the total number of O-RAM nodes.

Our experiments suggest that computation is not the bottleneck when O-RAM client algorithms (including the oblivious load balancer and the O-RAM node algorithms) are run on a modern processor.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

From the discussion above it will be appreciated that the invention can be embodied in various ways, including the following:

1. A method of concealing access patterns to electronic data storage, the method comprising: (a) within at least one server device configured for providing data storage services to at least one client, securely partitioning electronic data storage having N data blocks, each data block having a size of B bytes; (b) wherein the electronic data storage is partitioned within a partitioning framework into a plurality of P smaller electronic data storage partitions having a size of approximately N/P, and in which P is approximately equal to $\sqrt{N}$ data blocks; (c) performing electronic data storage access concealment, in which each block is randomly assigned to any of the P partitions, and whenever a data block is accessed during data accesses for reading a data block or writing a data block by the client, the data block is logically removed from its current partition and logically assigned to a fresh random partition selected from all P partitions, with the client tracking which partition each block is associated with at any point of time; and (d) encrypting data by the client when data blocks are stored on the server; (e) wherein the client repeatedly sorts and shuffles subsets of the data blocks in each partition during data accesses.

2. The method of any previous embodiment, wherein performing electronic data storage access concealment comprises: downloading and decrypting data blocks from the data blocks that are to be shuffled; shuffling the data blocks locally; and encrypting the data blocks and uploading them back to the server.

3. The method of any previous embodiment, wherein performing electronic data storage access concealment comprises performing any desired oblivious sorting or shuffling process on the data blocks to be shuffled without downloading them all at any one time.

4. The method of any previous embodiment, wherein the electronic data storage comprises random access memory (RAM), solid state drives (SSD), hard disk drives (HDD), or any combination thereof.

5. The method of any previous embodiment, further comprising the client maintaining P slots as a data cache for temporarily storing data blocks fetched from the server, and maintaining a position map to track which partition or cache slot in which each data block resides.

6. The method of any previous embodiment, further comprising storing metadata in the position map with state information about the data blocks.

7. The method of any previous embodiment, wherein server side determination of which data blocks are being accessed, how old data blocks were when last accessed, whether identical data blocks are accessed, determination of data block access patterns, and whether each data block access is a read or a write, is prevented)

8. The method of any previous embodiment, wherein the partitioning framework is configured for load balancing data blocks across multiple servers using at least one load balancing node.

9. The method of any previous embodiment, further comprising dynamically adding and removing lode balancing nodes and their associated storage.

10. The method of any previous embodiment, further comprising storing data blocks temporarily in a cache on the client and later writing them to the server in a different order within an eviction process.

11. The method of any previous embodiment, wherein the eviction process is performed at a fixed rate or an adjustable rate.

12. The method of any previous embodiment: wherein the eviction process comprises both foreground and background eviction; and wherein foreground evictions are performed along with each data access whereas background evictions are performed in a separate background thread during regular data block access operations.

13. The method of any previous embodiment, wherein the eviction process evicts dummy blocks when there are no real data blocks to evict.

14. The method of any previous embodiment: wherein each the partition has a plurality of levels between a bottom level and a top level; and wherein the shuffling is simultaneously performed on multiple partition levels together such that all consecutively filled levels from the bottom level upwards in the partition are shuffled into a first unfilled level; or if all levels are filled, then all levels are shuffled into the top level while removing duplicates during shuffling to ensure shuffled data can fit in the top level of the partition.

15. The method of any previous embodiment, further comprising compressing data blocks during shuffling.

16. The method of any previous embodiment, further comprising compressing dummy blocks together with data blocks containing real blocks of data.

17. The method of any previous embodiment, further comprising recursively applying the method of concealing access patterns to electronic data storage on the client memory resulting in different levels of partitioning.

18. The method of any previous embodiment: wherein the method of concealing access patterns to electronic data storage comprises an O-RAM process; and further comprising recursively applying the O-RAM process to client data of any O-RAM process.

19. The method of any previous embodiment, wherein the shuffling is performed on multiple partitions concurrently.

20. The method of any previous embodiment, wherein scheduling of operations between client and server is indistinguishable from a pattern of the data block accesses.

21. The method of any previous embodiment, further comprising using semaphores to bound an amount of electronic data storage used in the client.

22. The method of any previous embodiment, wherein the semaphore values do not contain any private information and are utilized to control rate of shuffling.

23. The method of any previous embodiment, further comprising utilizing a pipelined process to asynchronously shuffle the data blocks of multiple partition utilizing the method of concealing access patterns.

24. The method of any previous embodiment: wherein the storage services comprise cloud storage services; and wherein the method is configured for operation on trusted hardware in a cloud which has a combination of trusted hardware and untrusted hardware.

25. The method of any previous embodiment: wherein the storage services comprise cloud storage services; and wherein the method is configured for operation on untrusted hardware in a cloud which is all untrusted hardware.

26. The method of any previous embodiment, further comprising using a load balancer node to provide the oblivious load balancing, wherein the load balancer as a logical entity running on the at least one server to distribute workload across multiple servers in which partition framework is running on the load balancer node across which the load is being distributed comprise partitions.

27. The method of any previous embodiment, further comprising securely distributing workload across multiple servers.

28. The method of any previous embodiment, further comprising securely distributing the workload across multiple servers using a partition framework in which each server is an instance of the method of concealing access patterns to electronic data storage.

29. The method of any previous embodiment, wherein the storage services comprise cloud storage services.

30. A method of concealing access patterns to electronic data storage, the method comprising: (a) within at least one server device configured for providing storage services to at least one client, securely partitioning a electronic data storage having N data blocks, each having a size of B bytes; (b) wherein the electronic data storage is partitioned within a partitioning framework into a plurality of P smaller electronic data storage partitions having a size of approximately N/P, and in which P is approximately equal to $\sqrt{N}$ data blocks; and (c) performing electronic data storage access concealment, in which each block is randomly assigned to any of the P partitions, and whenever a data block is accessed during data accesses for reading a data block or writing a data block by the client, the data block is logically removed from its current partition and logically assigned to a fresh random partition selected from all P partitions, with the client tracking which partition each block is associated with at any point of time; (d) wherein the electronic data storage access concealment performs downloading and decrypting data blocks from data blocks that are to be shuffled, shuffling the data blocks locally, then finally encrypting the data blocks and uploading them back to the server; and (e) wherein the client repeatedly sorts and shuffles subsets of the data blocks in each partition during data accesses.

31. A system for concealing access patterns to electronic data storage, the system comprising: (a) at least one server configured for servicing at least one client with data storage services; (b) at least one client configured for accessing the server for performing write and read accesses of data blocks from the server; (c) wherein the server and the client are configured with a computer for executing programming for carrying out steps of access concealment, comprising: (i) securely partitioning electronic data storage in the at least one server to have N data blocks having a size of B bytes; (ii) wherein the electronic data storage is partitioned within a partitioning framework into a plurality of P smaller electronic data storage partitions having a size of approximately N/P, and in which P is approximately equal to $\sqrt{N}$ data blocks; (iii) performing electronic data storage access concealment, in which each block is randomly assigned to any of the P partitions, and whenever a data block is accessed during data accesses for reading a data block or writing a data block by the client, the data block is logically removed from its current partition and logically assigned to a fresh random partition selected from all P partitions, with the client tracking which partition each block is associated with at any point of time; and (iv) encrypting data by the client when data blocks are stored on the server; (v) wherein the client repeatedly sorts and shuffles subsets of the data blocks in each partition during data accesses.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Comparison of Existing O-RAM Proposals to Inventive Embodiments

| Type | Amortized Cost | Worst-case Cost | Client Storage | Server Storage | Practical Perf. |
|---|---|---|---|---|---|
| 1 | $O((\log N)^3)$ | $\Omega(N)$ | $O(1)$ | $O(N \log N)$ | >120,000X |
| 2 | $O((\log N)^2)$ | $O(N \log N)$ | $O(1)$ | $8N$ | 60,000 to ~80,000X |
| 3 | $O(\log N)$ | $O(N \log N)$ | $O(N^a)$ $(0 < a < 1)$ | $8N$ | >1,400X |
| A | $O(\log N)$ | $<3\sqrt{N} + o\sqrt{N}$ | $cN$ (c very small) | $<4N + o(N)$ | 20 to ~35X |
| B | $O(\log N)$ | $O(\log N)$ | $cN$ (c very small) | $<4N + o(N)$ | 20 to ~35X |
| C | $O((\log N)^2)$ | $O(\sqrt{N})$ | $O(\sqrt{N})$ | $O(N)$ | — |
| D | $O((\log N)^2)$ | $O((\log N)^2)$ | $O(\sqrt{N})$ | $O(N)$ | — |

1 = Goldreich-Ostrovsky,
2 = Pinkas-Reinman,
3 = Goodrich-Mitzenmacher.
A-D are for present invention.
A = Practical, Non-concurrent;
B = Practical, Concurrent;
C = Theoretical, Non-concurrent;
D = Theoretical, Concurrent.

TABLE 2

Suggested Parameterization Directed at Practical Construction

| Capacity (GB) | # Blocks | Client Storage | Server Storage | Client Store O-RAM Capacity | Practical Performance |
|---|---|---|---|---|---|
| 64 GB | $2^{20}$ | 204 MB | 205 GB | 0.297% | 22.5X |
| 256 GB | $2^{22}$ | 415 MB | 819 GB | 0.151% | 24.1X |
| 1 TB | $2^{24}$ | 858 MB | 3.2 TB | 0.078% | 25.9X |
| 16 TB | $2^{28}$ | 4.2 GB | 52 TB | 0.024% | 29.5X |
| 256 TB | $2^{32}$ | 31 GB | 819 TB | 0.011% | 32.7X |
| 1024 TB | $2^{34}$ | 101 GB | 3072 TB | 0.009% | 34.4X |

Block size for each = 64 KB

TABLE 3

Comparison of Inventive O-RAM with Best Known Previous Proposal

| # Blocks | Block Size | Practical Performance Ours | Best Known |
|---|---|---|---|
| $2^{16}$ | 16 MB | 18.4X | >1165X |
| $2^{18}$ | 4 MB | 19.9X | >1288X |
| $2^{20}$ | 1 MB | 21.5X | >1408X |
| $2^{22}$ | 256 KB | 23.2X | >1529X |
| $2^{24}$ | 64 KB | 25.0X | >1651X |

What is claimed is:

1. A method of concealing access patterns to electronic data storage, the method comprising:
    (a) within at least one server device configured for providing data storage services to at least one client, securely partitioning electronic data storage having N data blocks, each data block having a size of B bytes;
    (b) wherein said electronic data storage is partitioned within a partitioning framework into a plurality of P smaller electronic data storage partitions having a size of N/P, and in which P is equal to $\sqrt{N}$ data blocks;
    (c) performing electronic data storage access concealment, in which each block is randomly assigned to any of the P partitions, and whenever a data block is accessed during data accesses for reading a data block or writing a data block by the client, the data block is logically removed from its current partition and logically assigned to a fresh random partition selected from all P partitions, with the client tracking which partition each block is associated with at any point of time; and (d) encrypting data by the client when data blocks are stored on the server; (e) wherein the client repeatedly sorts and shuffles subsets of said data blocks in each partition during data accesses.

2. The method recited in claim 1, wherein performing electronic data storage access concealment comprises:
    downloading and decrypting data blocks from said data blocks that are to be shuffled;

shuffling said data blocks locally; and encrypting said data blocks and uploading them back to the server.

3. The method recited in claim 1, wherein performing electronic data storage access concealment comprises performing any desired oblivious sorting or shuffling process on said data blocks to be shuffled without downloading them all at any one time.

4. The method recited in claim 1, wherein said electronic data storage comprises random access memory (RAM), hard disk drives (HDD), or any combination thereof.

5. The method recited in claim 1, further comprising the client maintaining P slots as a data cache for temporarily storing data blocks fetched from the server, and maintaining a position map to track which partition or cache slot in which each data block resides.

6. The method recited in claim 5, further comprising storing metadata in said position map with state information about the data blocks.

7. The method recited in claim 1, wherein server side determination of which data blocks are being accessed, how old data blocks were when last accessed, whether identical data blocks are accessed, determination of data block access patterns, and whether each data block access is a read or a write, is prevented.

8. The method recited in claim 1, further comprising storing data blocks temporarily in a cache on the client and later writing them to the server in a different order within an eviction process.

9. The method recited in claim 8, wherein said eviction process is performed at a fixed rate or an adjustable rate.

10. The method recited in claim 8:

wherein said eviction process comprises both foreground and background eviction; and wherein foreground evictions are performed along with each data access whereas background evictions are performed in a separate background thread during regular data block access operations.

11. The method recited in claim 8, wherein said eviction process evicts dummy blocks when there are no real data blocks to evict.

12. The method recited in claim 1:

wherein each said partition has a plurality of levels between a bottom level and a top level; and wherein said shuffling is simultaneously performed on multiple partition levels together such that all consecutively filled levels from the bottom level upwards in said partition are shuffled into a first unfilled level; or if all levels are filled, then all levels are shuffled into the top level while removing duplicates during shuffling to ensure shuffled data can fit in the top level of said partition.

13. The method recited in claim 1, further comprising compressing data blocks during shuffling.

14. The method recited in claim 13, further comprising compressing dummy blocks together with data blocks containing real blocks of data.

15. The method recited in claim 1, further comprising recursively applying said method of concealing access patterns to electronic data storage on the client memory resulting in different levels of partitioning.

16. The method recited in claim 1:

wherein said method of concealing access patterns to electronic data storage comprises an O-RAM process; and further comprising recursively applying said O-RAM process to client data of any O-RAM process.

17. The method recited in claim 1, wherein said shuffling is performed on multiple partitions concurrently.

18. The method recited in claim 1, wherein scheduling of operations between client and server is indistinguishable from a pattern of said data block accesses.

19. The method recited in claim 1, wherein said storage services comprise cloud storage services.

20. A method of concealing access patterns to electronic data storage, the method comprising:

(a) within at least one server device configured for providing storage services to at least one client, securely partitioning a electronic data storage having N data blocks, each having a size of B bytes;

(b) wherein said electronic data storage is partitioned within a partitioning framework into a plurality of P smaller electronic data storage partitions having a size of N/P, and in which P is equal to $\sqrt{N}$ data blocks; and (c) performing electronic data storage access concealment, in which each block is randomly assigned to any of the P partitions, and whenever a data block is accessed during data accesses for reading a data block or writing a data block by the client, the data block is logically removed from its current partition and logically assigned to a fresh random partition selected from all P partitions, with the client tracking which partition each block is associated with at any point of time;

(d) wherein said electronic data storage access concealment performs downloading and decrypting data blocks from data blocks that are to be shuffled, shuffling said data blocks locally, then finally encrypting said data blocks and uploading them back to the server; and (e) wherein the client repeatedly sorts and shuffles subsets of said data blocks in each partition during data accesses.

21. A system for concealing access patterns to electronic data storage, the system comprising:

(a) at least one server configured for servicing at least one client with data storage services;

(b) at least one client configured for accessing said server for performing write and read accesses of data blocks from said server;

(c) wherein said server and said client are configured with a computer for executing programming for carrying out steps of access concealment, comprising:

(i) securely partitioning electronic data storage in said at least one server to have N data blocks having a size of B bytes;

(ii) wherein said electronic data storage is partitioned within a partitioning framework into a plurality of P smaller electronic data storage partitions having a size of N/P, and in which P is equal to equal to $\sqrt{N}$ data blocks;

(iii) performing electronic data storage access concealment, in which each block is randomly assigned to any of the P partitions, and whenever a data block is accessed during data accesses for reading a data block or writing a data block by said client, the data block is logically removed from its current partition and logically assigned to a fresh random partition selected from all P partitions, with the client tracking which partition each block is associated with at any point of time; and (iv) encrypting data by the client when data blocks are stored on the server;

(v) wherein the client repeatedly sorts and shuffles subsets of said data blocks in each partition during data accesses.

* * * * *